(12) United States Patent
Radke et al.

(10) Patent No.: US 10,498,171 B2
(45) Date of Patent: Dec. 3, 2019

(54) WIRELESS POWER RECEIVER VOLTAGE CONTROL ENABLING SIMULTANEOUS COMMUNICATIONS TO TRANSMITTER IN OVER-VOLTAGE STATE

(71) Applicant: AVAGO TECHNOLOGIES INTERNATIONAL SALES PTE. LIMITED, Singapore (SG)

(72) Inventors: Russell E. Radke, Fort Collins, CO (US); Ryan Desrosiers, Fort Collins, CO (US); Chia-Jen Hsu, Irvine, CA (US); Desheng Ma, Irvine, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 408 days.

(21) Appl. No.: 15/266,689

(22) Filed: Sep. 15, 2016

(65) Prior Publication Data

US 2017/0104368 A1    Apr. 13, 2017

Related U.S. Application Data

(60) Provisional application No. 62/240,153, filed on Oct. 12, 2015.

(51) Int. Cl.
| | |
|---|---|
| *H02J 50/12* | (2016.01) |
| *H02J 7/02* | (2016.01) |
| *H02J 50/80* | (2016.01) |
| *H02H 1/00* | (2006.01) |
| *H02H 9/04* | (2006.01) |

(52) U.S. Cl.
CPC ......... *H02J 50/12* (2016.02); *H02H 1/0061* (2013.01); *H02J 7/025* (2013.01); *H02J 50/80* (2016.02); *H02H 9/041* (2013.01)

(58) Field of Classification Search
CPC .......... H02J 50/12; H02J 50/80; H02J 7/025; H02H 1/0061
USPC ........................................................ 307/104
See application file for complete search history.

(56) References Cited

U.S. PATENT DOCUMENTS

| | | | |
|---|---|---|---|
| 9,350,194 B2 | 5/2016 | Desrosiers | |
| 2012/0183097 A1* | 7/2012 | Ishizaki | H02J 17/00 375/295 |
| 2012/0300519 A1* | 11/2012 | Clemmons | H02M 7/2173 363/127 |
| 2014/0021911 A1* | 1/2014 | Baarman | H02J 7/025 320/108 |
| 2016/0126752 A1* | 5/2016 | Vuori | H02J 7/04 307/104 |

(Continued)

*Primary Examiner* — Daniel Kessie
*Assistant Examiner* — Swarna N Chowdhuri
(74) *Attorney, Agent, or Firm* — Xsensus, LLP

(57) ABSTRACT

A wireless power receiver includes circuitry configured to receive a wirelessly induced voltage from a wireless power transmitter via a magnetically induced connection with the wireless power transmitter. It is determined that an over-voltage condition exists when the wirelessly induced voltage exceeds a threshold voltage, and the wirelessly induced voltage is reduced in response to determining that the overvoltage condition exists. The circuitry communicates the overvoltage condition to the wireless power transmitter via the magnetically induced connection while over-voltage protection is enabled.

19 Claims, 25 Drawing Sheets

(56) References Cited

U.S. PATENT DOCUMENTS

2017/0237296 A1\* 8/2017 Keith .................... H02J 7/0042
307/104

\* cited by examiner

WIRELESS POWER RECEIVER VOLTAGE CONTROL ENABLING SIMULTANEOUS COMMUNICATIONS TO TRANSMITTER IN OVER-VOLTAGE STATE

CROSS-REFERENCE TO RELATED APPLICATIONS

The present application claims the benefit of the earlier filing date of U.S. provisional application 62/240,153 filed in the U.S. Patent and Trademark Office on Oct. 12, 2015, the entire contents of which being incorporated herein by reference.

TECHNICAL FIELD

The present disclosure relates to wireless power transfer, specifically limiting voltage in a wireless power receiver in an overvoltage condition.

BACKGROUND

Power may be transmitted wirelessly from a transmitter to a receiver in an electronic device, and the receiver may be used to provide power to hardware and/or circuitry coupled to the receiver. For example, a transmitter can include a transmitter coil which generates a magnetic flux to be applied across a receiver coil in a receiver, wirelessly inducing current in the receiver.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
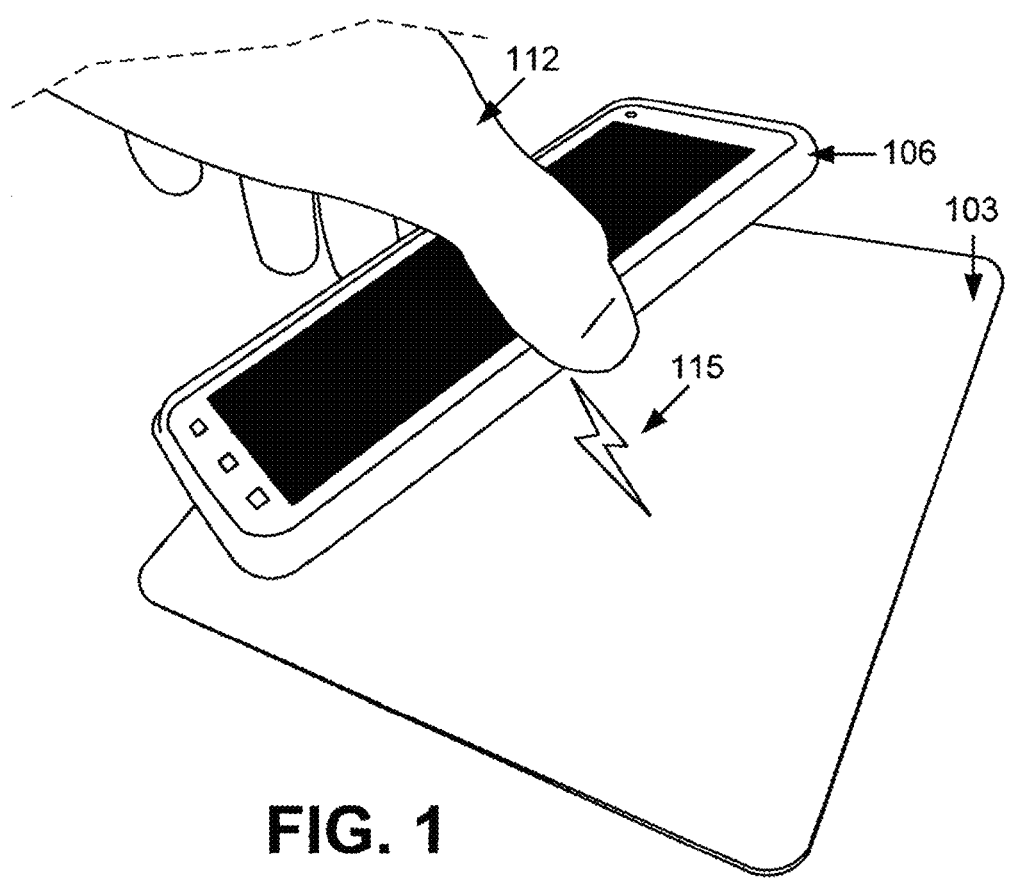
FIG. 1 is a drawing of a wireless charging pad powering a portable device.

In an exemplary implementation, a device includes circuitry configured to receive a wirelessly induced voltage from a remote device via a magnetically induced connection with the remote device. It is determined that an overvoltage condition exists when the wirelessly induced voltage exceeds a threshold voltage, and the wirelessly induced voltage is reduced in response to determining that the overvoltage condition exists. The circuitry communicates the overvoltage condition to the remote device via the magnetically induced connection.

In another exemplary implementation, a process includes receiving, at an electromagnetic coil of a device, a wirelessly induced voltage from a remote device via a magnetically induced connection with the remote device; determining, via circuitry of the device, that an overvoltage condition exists in a case that the wirelessly induced voltage exceeds a first threshold voltage; reducing, at a rectifier of the device, a magnitude of the wirelessly induced voltage in response to determining that the overvoltage condition exists; and communicating, via the circuitry, the overvoltage condition to the another device via the magnetically induced connection.

In another exemplary implementation, a wireless power receiver includes circuitry configured to receive a wirelessly induced voltage from a Power Matters Alliance (PMA) or Wireless Power Consortium (WPC) wireless power transmitter via a magnetically induced connection with the transmitter, determine that an overvoltage condition exists in a case that the voltage exceeds a first threshold voltage, reduce a magnitude of the voltage in response to determining that the overvoltage condition exists, and communicate the overvoltage condition to the wireless power transmitter via the magnetically induced connection.

Aspects of the present disclosure are directed to controlling voltage in a wireless power receiver. Power may be transmitted wirelessly from a wireless power transmitter to a wireless power receiver within or otherwise coupled to an electronic device, wherein the wireless power receiver may be used to provide power to hardware and/or circuitry within the electronic device. For example, a wireless power transmitter can include a transmitter coil that may generate a magnetic flux to be applied across a receiver coil in a wireless power receiver, thereby wirelessly inducing a voltage in the wireless power receiver. As may be appreciated, resonant or inductive wireless power receivers lack control over the magnetic flux applied to the receiver coil. A high magnetic flux may induce a voltage in the receiver exceeding voltage limits of the hardware and/or circuitry within an electronic device as well as circuitry in the wireless power receiver itself.

Generally, to prevent a voltage exceeding voltage capabilities of a receiver, the magnetic flux generated via the transmitter coil is reduced. This results in a reduced power transfer for circuits, hardware, and/or devices that are using the transmitter to receive power. Similarly, the dimensions of the receiver coil may be modified to reduce the received voltage. This may result in reduced convenience and/or usability of a wireless power system.

According to various embodiments of the present disclosure, a voltage induced in a wireless power receiver by a wireless power transmitter may be controlled in the wireless power receiver hysteretically, thereby permitting the wireless power transmitter to operate with a maximum magnetic flux. This implementation may not result in a reduction in receiver coil dimensions, thus granting maximum positional freedom for achieving a wireless power system. Control over the voltage induced in a wireless power receiver may be employed using a comparator configured to compare a voltage generated by the induced current to a threshold voltage indicating a capability of circuitry coupled to the wireless power receiver. In the event the voltage generated by the induced current exceeds the threshold voltage, the voltage may be limited to a safe value.

A wireless power receiver receives a current induced by a magnetic flux generated by a wireless power transmitter and a comparator compares a voltage generated by the induced current to a threshold voltage indicating a capability of circuitry coupled to the wireless power receiver. In the event the voltage generated by the induced current exceeds the threshold voltage, the voltage is limited to a safe value while the wireless power receiver communicates an overvoltage condition to the wireless power transmitter.

In some implementations, providing overvoltage protection (OVP) for the wireless power receiver includes shunting positive and negative lines on either side of the coil to ground in response detecting that a received voltage exceeds the threshold voltage, which disables the receiver side of the coil until the voltage at the receiver is less than the threshold voltage. However, while the positive and negative lines are shunted to ground, the ability to communicate an overvoltage condition back to the wireless power transmitter is limited. In some aspects, the wireless power receiver can be configured to permit voltage limiting during an overvoltage condition while simultaneously enabling digital communications from the wireless power receiver to the wireless power transmitter that reports an overvoltage condition to the wireless power transmitter.

With reference to FIG. 1, shown is a charging station 103 that may be used in the wireless charging of a portable device 106. A portable device 106 may be embodied as a portable computer, a laptop computer, personal digital assistant, cellular telephone, smartphone, music player, web pad, tablet computer system, portable game console, electronic book reader, or other device with similar capability. The charging station 103, acting as a wireless power transmitter, may be connected to a power source such as a battery or an electrical outlet connected to a power grid.

When a person 112 physically places a portable device 106 on or near the charging station 103, the charging station 103 provides for wireless power transmission 115 by wirelessly inducing a voltage in a receiver located within or otherwise connected to the portable device 106, thereby transferring power from the power source connected to the charging station 103 to the portable device 106. The power may be used, for example, to charge a battery in the portable device 106. Similarly, the power may be used to directly power circuitry or hardware in the portable device 106.

Prior to transferring power by generating a magnetic flux in the transmitter (e.g., the charging station 103), communication between the charging station 103 and the portable device 106 may be established, thereby permitting the portable device 106 to transmit requests of the portable device 106 to the charging station 103. For example, requests can include capabilities of the portable device 106 such as voltage capabilities of hardware and/or circuitry within the portable device 106. Communication between the charging station 103 and the portable device 106 may be accomplished using various wireless mediums of communication such as Bluetooth, Zygbee, Infared (IR), and/or various other types of communication such as load modulation of the received wireless power. As can be appreciated, conflicts may arise when multiple portable devices 106 are placed on or near the charging station 103, as multiple portable devices 106 may communicate varying voltage capabilities, as will be discussed in greater detail herein.

Figure 2:
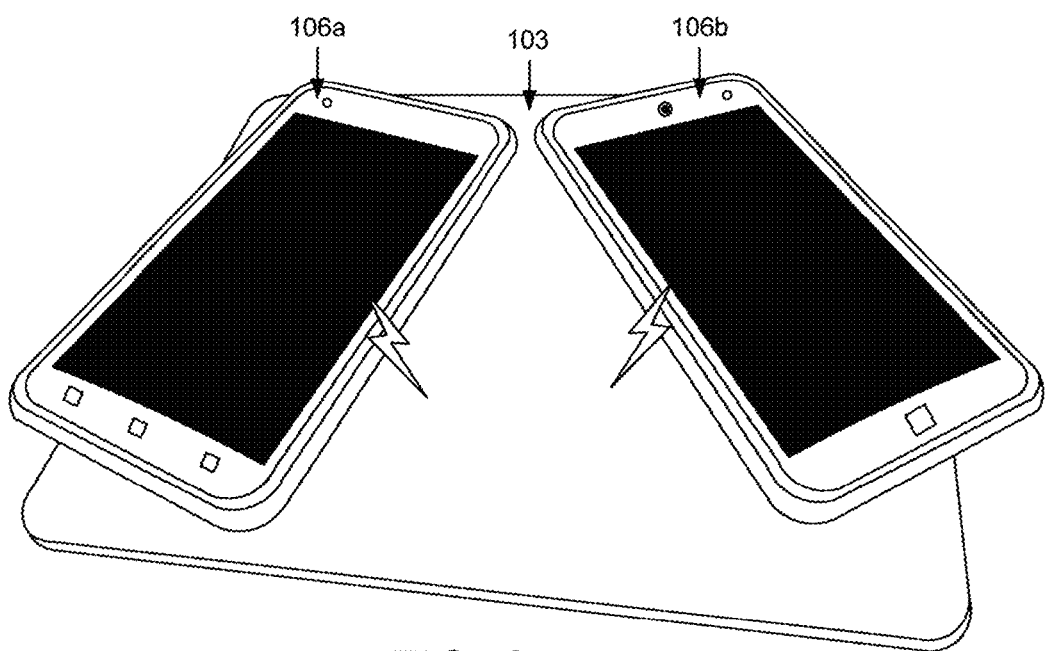
FIG. 2 is a drawing of a wireless charging pad powering multiple portable devices.

Turning to FIG. 2, a charging station 103 is shown that may be used in the wireless charging of multiple portable devices 106a and 106b. As discussed above with respect to FIG. 1, a portable device 106 may be embodied as a portable computer, a laptop computer, personal digital assistant, cellular telephone, smartphone, music player, web pad, tablet computer system, portable game console, electronic book reader, or other device with similar capability.

By physically placing multiple portable devices (e.g., 106a and 106b) on or near the charging station 103, the charging station 103 may wirelessly induce a voltage in multiple receivers (not shown) within the multiple portable devices 106. As can be appreciated, the voltage capabilities of a first portable device 106a may vary from the voltage capabilities of a second portable device 106b. For example, hardware and/or circuitry within a first portable device 106a may be able to withstand 20 Volts (V) while hardware and/or circuitry within the second portable device 106b may be able to withstand 50V. Additionally, the placement of the portable devices 106a and/or 106b on the charging station 103 may affect the charging of the portable devices 106a and/or 106b.

The voltage capabilities of the multiple portable devices 106 may be communicated to and recognized by the charging station 103. In some implementations, to accommodate the portable device 106a that only can withstand 20V, the charging station 103 may reduce a magnetic flux generated by the charging station 103 that induces voltages in the portable devices 106a and 106b. The reduced magnetic flux can affect the charging and/or powering of the second portable device 106b capable of withstanding a higher voltage (i.e., 50V), especially if the placement of the portable devices 106 on the charging station 103 is not optimal. Thus, accounting for voltages induced by a transmitter (e.g., the charging station 103) in one or more wireless power receivers within or otherwise coupled to the portable devices 106 may provide improved charging capabilities for the portable devices 106a and 106b that have varied voltage ratings. To this end, a high magnetic flux may be generated to accommodate the portable device 106b capable of withstanding a higher voltage while not impairing the portable device 106a capable of withstanding a lower voltage.

Figure 3:
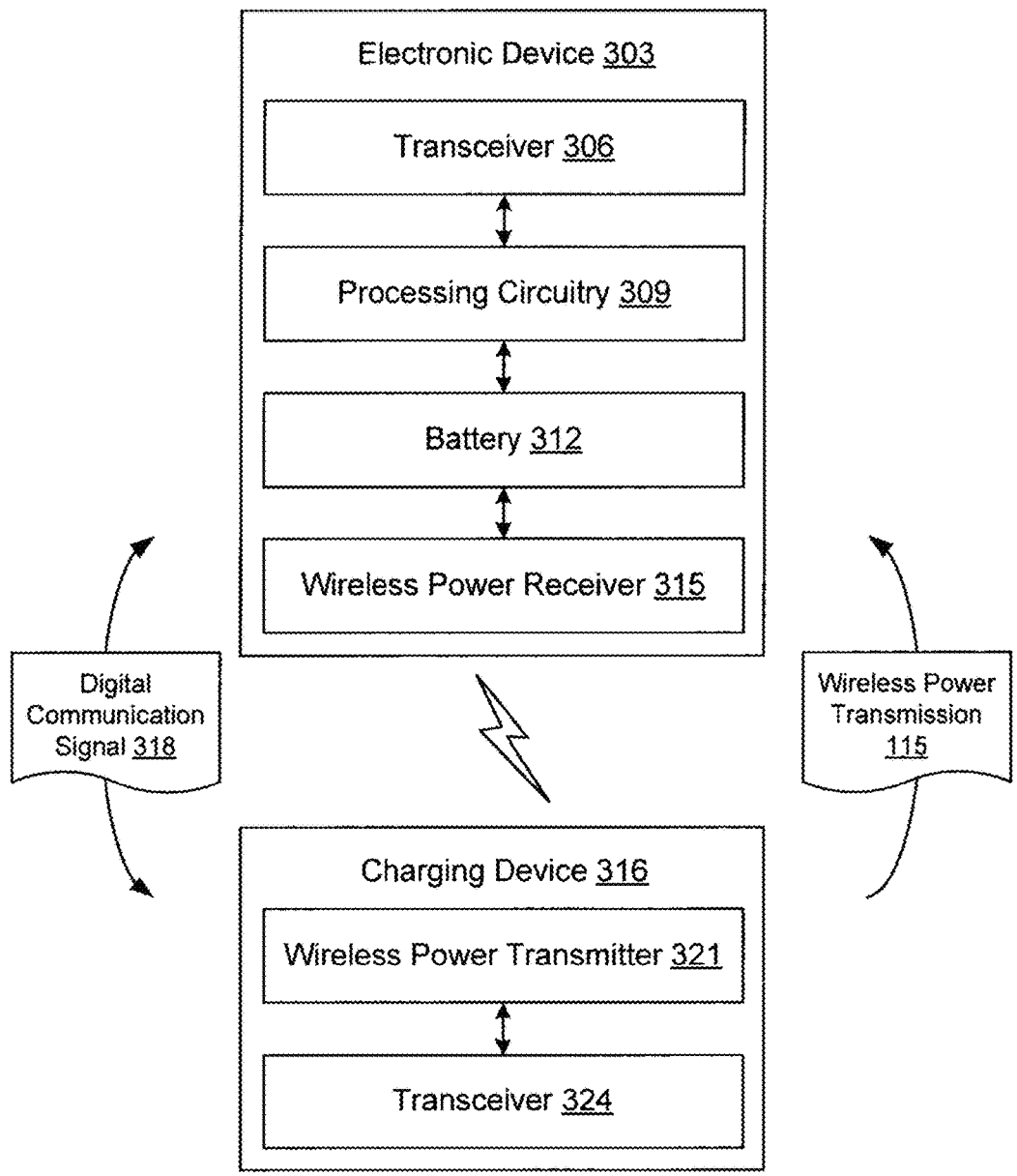
FIG. 3 is a drawing of a schematic block diagram that provides one example illustration of a transmitter and receiver configured to wirelessly receive power.

Turning now to FIG. 3, shown is a schematic block diagram that provides one example illustration of a transmitter and receiver configured to wirelessly receive power according to various embodiments of the present disclosure. An electronic device 303, such as portable device 106 (FIG. 1), may include a transceiver 306, processing circuitry 309, a battery 312, and/or a wireless power receiver 315. The transceiver 306 may include, for example, a Bluetooth transceiver configured to enable communication between the charging device 316, such as charging station 103 (FIG. 1), and the electronic device 303 by transmitting and/or receiving one or more digital communication signals 318. Similarly, according to some implementations, the transceiver 306 may include a Zygbee and/or IR transceiver. In addition, the communications mechanism may be achieved by load modulation whereby the wireless power receiver 315 modulates the power received in a digital manner that can be interpreted as a communications signal by the wireless power transmitter 321.

A charging device 316 may include a wireless power transmitter 321 and/or a transmitter transceiver 324. The transmitter transceiver 324 may include, for example, a Bluetooth transceiver configured to enable communication between the charging device 316 and the electronic device 303 by transmitting and/or receiving one or more digital communication signals 318. Similarly, the transmitter transceiver 324 may include a Zygbee and/or IR transceiver. The transmitter transceiver 324 may support communications with multiple electronic devices 303.

When communication is established between the electronic device 303 and the charging device 316, the charging device 316 may conduct wireless power transmission 115 from the wireless power transmitter 321 to the wireless power receiver 315 within the electronic device 303 according to capabilities provided in the digital communication signals 318. As a non-limiting example, a wireless power transmitter 321 may include an electromagnetic coil capable of generating a magnetic flux across an electromagnetic coil within the wireless power receiver 315, the magnetic flux inducing a voltage in the wireless power receiver 315. A current may result from the voltage that may be used to charge the battery 312 within the portable device 106 and/or to directly power the processing circuitry 309 within or otherwise coupled to the electronic device 303. The transceiver 306 in the electronic device 303 may be used to communicate to the charging device 315 when the wireless power transmitter 321 should terminate a wireless power transmission 115, such as when the battery 312 has been fully charged.

Figure 4:
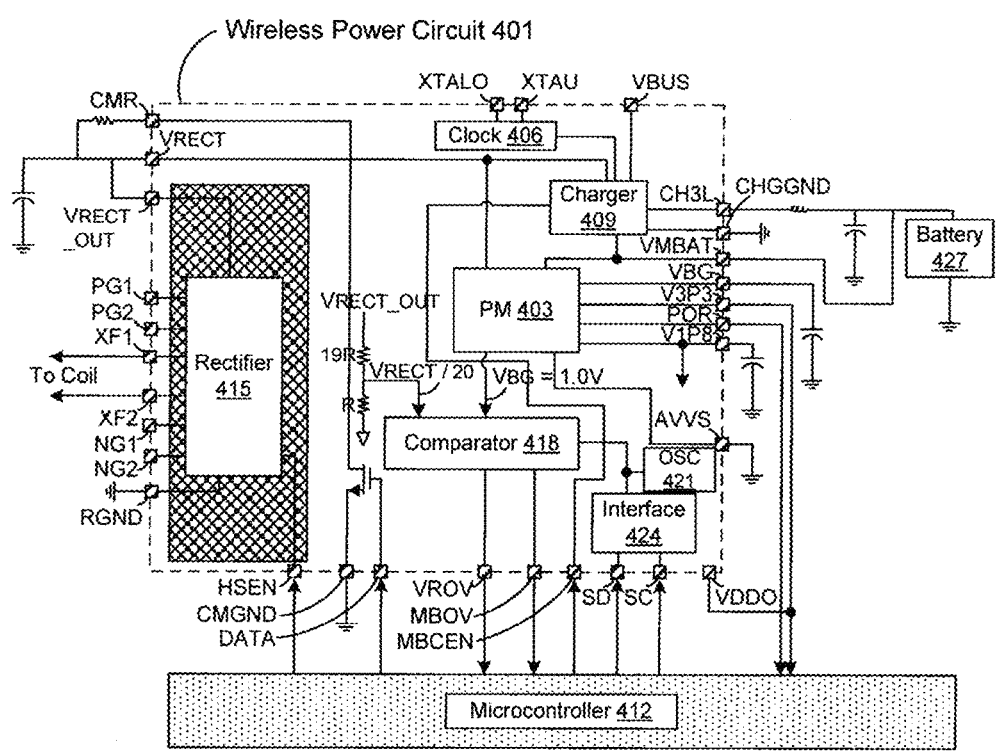
FIG. 4 is an integrated circuit diagram configured to control voltage in a wireless power receiver.

In FIG. 4, a schematic diagram of a power control circuit 400 is shown that is configured to control voltage in a wireless power receiver 315 according to various aspects of the present disclosure. In the non-limiting example of FIG. 4, a power control circuit 400 may include a wireless power circuit 401, which can include a power manager 403, a clock 406, a battery charger 409, a rectifier 415, one or more comparators 418, a resistor-capacitor (RC) oscillator 421, an interface 424 including a bus/register map, and/or other components that may be employed to control voltage in a receiver. The wireless power circuit 401 may interface with a microcontroller 412, a battery 427, and other components of the wireless power receiver 315.

The power manager 403 is configured to manage power specifications for a host system (e.g., an electronic device 303 (FIG. 3)). The clock 406 may be configured to provide the power control circuit 400 with a repetitive signal such as a sine wave or a square wave. According to various implementations, the clock 406 may include a crystal clock (XO) oscillator and/or a phase-locked loop (PLL) clock oscillator.

The microcontroller 412 can include a processor, memory, and/or programmable I/O peripherals. This microcontroller 412 may also be integrated into the wireless power circuit 401. According to various embodiments, the microcontroller 412 may include a NuvoTon NCU120 microcontroller, or like component. In some implementations, the microcontroller 412 includes a processor with circuitry configured to perform one or more processes described further herein. For example, the microcontroller 412 can detect an overvoltage condition that exists when the rectified voltage $V_{RX}$ exceeds the threshold voltage VTH, output control signals to reduce the voltage at the wireless power receiver 315, and generate signals to communicate to the wireless power transmitter 321 that the overvoltage condition exists. Details regarding the processes performed by the microcontroller 412 are discussed further herein. The rectifier 415 may be configured to convert alternating current (AC) to direct current (DC).

The one or more comparators 418 are configured to compare two voltages or currents and provide an output indicating which of the two voltages has a greater voltage. In the non-limiting example of FIG. 4, a comparator 418 is configured to compare a received voltage that has been rectified ($V_{RX}$, depicted in FIG. 4 as $V_{RECT}$) to a threshold voltage ($V_{TH}$, depicted in FIG. 4 as $V_{BG}$). As will be discussed in greater detail below, a bandgap voltage $V_{BG}$ may be used to compare the received voltage to a voltage indicating the voltage capabilities of the system coupled to the wireless power circuit 401. The received voltage ($V_{RX}$, depicted in FIG. 4 as $V_{RECT\_OUT}$) may be reduced or amplified at the comparator 418 as depicted in FIG. 4. For example, the received voltage ($V_{RX}$, depicted in FIG. 4 as $V_{RECT\_OUT}$) may be reduced using a resistance bridge or other one or more components to appropriately reduce the received voltage prior to a comparison in the comparator 418 between the received voltage and the bandgap voltage. In the non-limiting example of FIG. 4, the bandgap voltage may be set as 1.0V although the bandgap voltage may be any other voltage indicating the capabilities of the system coupled to the wireless power circuit 401. Similarly, the resistance of the resistance bridge may be modified to provide an appropriate voltage to the comparator 418. According to various embodiments of the present disclosure, the received voltage ($V_{RX}$, depicted in FIG. 4 as $V_{RECT}$) may be compared to a threshold voltage of the battery ($V_{MBAT}$) in the comparator 418, where the threshold voltage indicates the maximum voltage capabilities of the battery coupled to the system. In other implementations, the microcontroller 412 performs the comparison of the threshold voltage of the battery and the received voltage.

As discussed above, a threshold voltage may indicate the capabilities of a system, hardware, and/or circuitry including or otherwise connected to the power control circuit 400. In the non-limiting example of FIG. 4, the wireless power circuit 401 is coupled to a battery 427 that may power an electronic device 303. Accordingly, the threshold voltage ($V_{TH}$, depicted in FIG. 4 as $V_{MBAT}$) may reflect a maximum reliability voltage for the particular battery 427 coupled to the power control circuit 400. Accordingly, the received voltage is converted from an AC signal to a DC signal ($V_{RX}$, depicted in FIG. 4 as $V_{RECT\_OUT}$) and used as an output voltage ($V_{RECT}$). According to some implementations, the wireless power circuit 401 of FIG. 4 may be embodied in a single chip.

Figure 5:
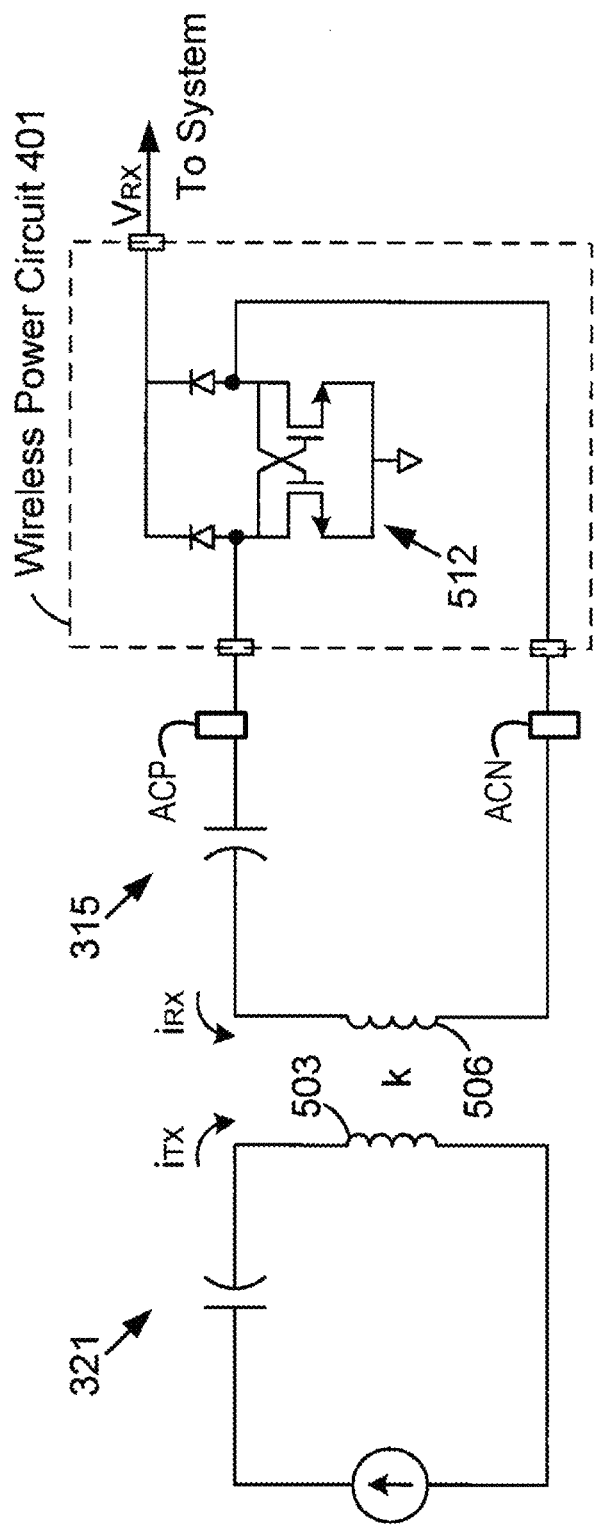
FIG. 5 is a drawing of a circuit diagram including a wireless power receiver and a wireless power transmitter.

With reference to FIG. 5, shown is an example of a circuit diagram of a wireless power receiver 315 and a wireless power transmitter 321 according to various embodiments of the present disclosure. A wireless power transmitter 321 may include, for example, an electromagnetic coil 503 configured to generate a magnetic field. A wireless power receiver 315 located within the magnetic field may couple with the magnetic flux via an electromagnetic coil 506 within the wireless power receiver 315. A wireless power circuit 401 includes a rectification circuit 512 coupled to the electromagnetic coil 506 that may include one or more transistors, diodes, or other components that prepare the voltage induced by the magnetic flux for use by a system (e.g., by circuits and/or hardware of an electronic device 303 (FIG. 3)). Accordingly, the voltage induced in the wireless power receiver 315 may be passed directly to the system. If the voltage exceeds a voltage capability of the system, the system may be damaged or otherwise impaired.

The current ($i_{RX}$) from the electromagnetic coil 506 is an AC current that is sent to the rectification circuit 512 for conversion to DC. As a non-limiting example, the rectification circuit 512 may include diodes, transistors, and/or metal-oxide-semiconductor (MOS) devices such as N-channel metal-oxide-semiconductor (NMOS) devices and/or P-channel metal-oxide-semiconductor (PMOS) devices. The output of the rectification circuit 512 is a DC voltage ($V_{RX}$) that can be used by the system. For example, the DC voltage may be used to power a battery in a portable device 106 (e.g., a mobile phone, tablet, computer).

The AC current ($i_{RX}$) in the wireless power receiver 315 is a function of the Tx/Rx coil dimensions, transmitter current, and coupling factor (k). The coupling factor (k) varies significantly depending on where a user places an electronic device 303 (FIG. 3) on or near a charging device 316 (FIG. 3). For a large coupling factor (k), a high voltage level is provided in the wireless power receiver 315 resulting in a large received voltage ($V_{RX}$). In Alliance for Wireless Power (A4WP) systems, this voltage can be as high as 30V.

Figure 6:
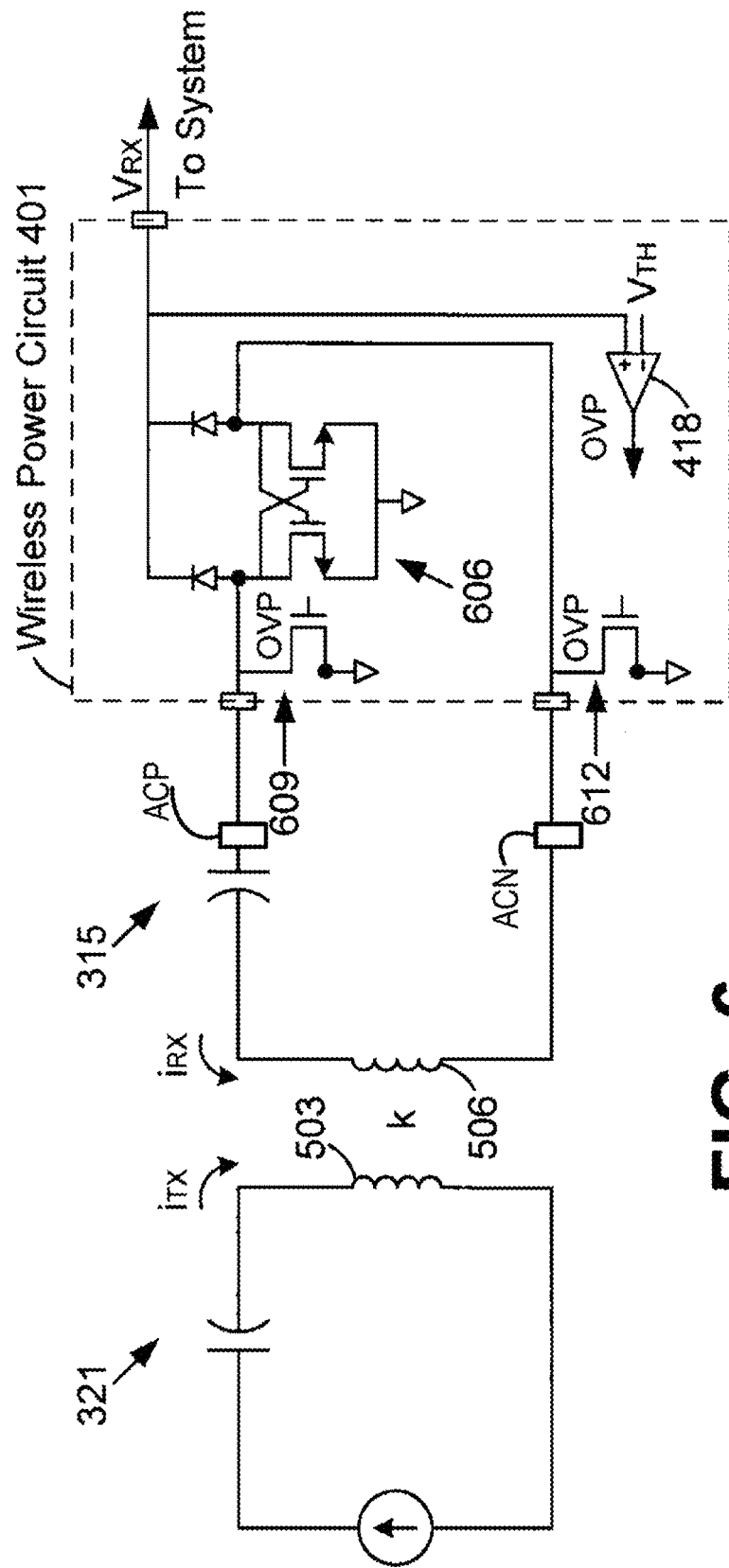
FIG. 6 is another drawing of a circuit diagram including a wireless power receiver and a wireless power transmitter.

Referring next to FIG. 6, shown is another example of a schematic diagram of a wireless power receiver 315 and a wireless power transmitter 321 according to various implementations of the present disclosure. As discussed above with respect to FIG. 5, a wireless power transmitter 321 may include, for example, an electromagnetic coil 503 configured to generate a magnetic field. A wireless power receiver 315 located within the magnetic field couples to the magnetic flux with an electromagnetic coil 506 within or otherwise coupled to the wireless power receiver 315.

In the non-limiting example of FIG. 6, a wireless power circuit 401 coupled to the electromagnetic coil 506 may include a rectification circuit 606 that may include at least two metal-oxide-semiconductor (MOS) devices, a comparator 418 to control the at least two MOS devices, and one or more overvoltage components, as will be discussed in greater detail below. The rectification circuit 606 is configured to prepare a voltage induced by the magnetic flux for use by a system (e.g., by circuits and/or hardware of an electronic device 303 (FIG. 3)). The comparator 418 may compare a received voltage ($V_{RX}$) to a threshold voltage ($V_{TH}$). The comparator 418 can provide an output based upon which of the two input voltages is greater. The output of the comparator 418 can be used to control overvoltage protection components (e.g., 609 and 612). If the received voltage exceeds the threshold voltage, the overvoltage protection components (e.g., 609 and 612) MOS-type devices may shunt the current ($i_{RX}$) in the wireless power receiver 315 and/or the wireless power circuit 401, thereby causing the voltage ($V_{RX}$) to be less than or equal to the threshold voltage ($V_{TH}$). The threshold voltage ($V_{TH}$) may be predefined via the components of the circuit or programmatically predefined and may indicate a voltage at which the system may safely operate. According to some implementations, the MOS devices of the overvoltage protection components 609 and 612 may be configured at a low resistance (e.g., approximately 250 mOhms), resulting in negligible power loss in the system while the transmitter current is being shunted from the rectifier AC input to ground.

According to an additional example, if the received voltage exceeds the threshold voltage ($V_{RX} > V_{TH}$, detected by the comparator 418), a digital communication signal 318 may be communicated by the transceiver 306 from the wireless power receiver 315 to a transmitter transceiver 324 within and/or coupled to the charging device 316 that is capable of communicating with the wireless power transmitter 321. The transceiver 306 may include, for example, a Bluetooth transceiver within the electronic device 303. Although the high voltage is accounted for in the wireless power receiver 315, the transceiver 306 may notify the wireless power transmitter 321 that the wireless power receiver 315 has received too high of a voltage, permitting the wireless power transmitter 321 to adjust the generation of magnetic flux to a predefined level and/or a level defined in the communication, although the wireless power transmitter 321 may not do this if more than one electronic device 303 is being powered by the wireless power transmitter 321.

Figure 7:
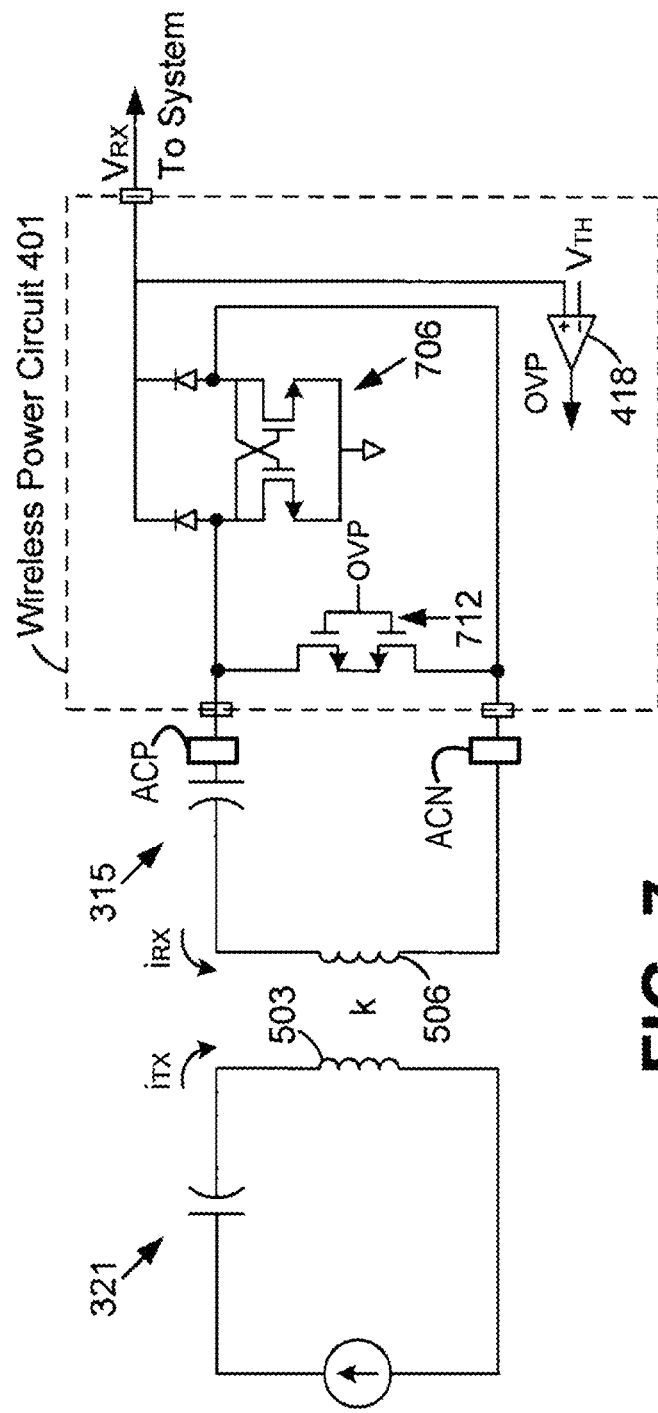
FIG. 7 is yet another drawing of a circuit diagram including a wireless power receiver and a wireless power transmitter.

Turning now to FIG. 7, shown is yet another example of a circuit diagram of a wireless power receiver 315 and a wireless power transmitter 321. As discussed above with respect to FIGS. 5 and 6, a wireless power transmitter 321 may include, for example, an electromagnetic coil 503 configured to generate a magnetic field. A wireless power receiver 315 located within the magnetic field may receive magnetic flux within an electromagnetic coil 506 of the wireless power receiver 315.

In the non-limiting example of FIG. 7, a wireless power circuit 401 coupled to the electromagnetic coil 506 may include a rectification circuit 706 that may include diodes, transistors, and/or MOS devices and a comparator 418 to control the diodes, transistors, and/or MOS devices. The rectification circuit 706 is configured to prepare a voltage induced by the magnetic flux for use by a system (e.g., circuits and/or hardware of an electronic device 303 (FIG. 3)). The comparator 418 may compare a received voltage ($V_{RX}$) to a threshold voltage ($V_{TH}$).

As depicted in FIG. 7, an implementation of controlling the voltage in a wireless power receiver 315 may include shorting the electromagnetic coil 506 within or otherwise coupled to the wireless power receiver 315 using one or more MOS-type devices 712 during overvoltage protection, thereby negating the effect of the electromagnetic coil 506 on the wireless power receiver 315. Accordingly, if the received voltage exceeds the threshold voltage, the overvoltage protection components may short the electromagnetic coil 506 until the voltage in the wireless power receiver 315 and/or the wireless power circuit 401 returns to a state of being less than or equal to the threshold voltage ($V_{TH}$). The threshold voltage ($V_{TH}$) may be predefined via the components of the circuit or programmatically predefined and may indicate a voltage at which the system may safely operate.

Figure 8:
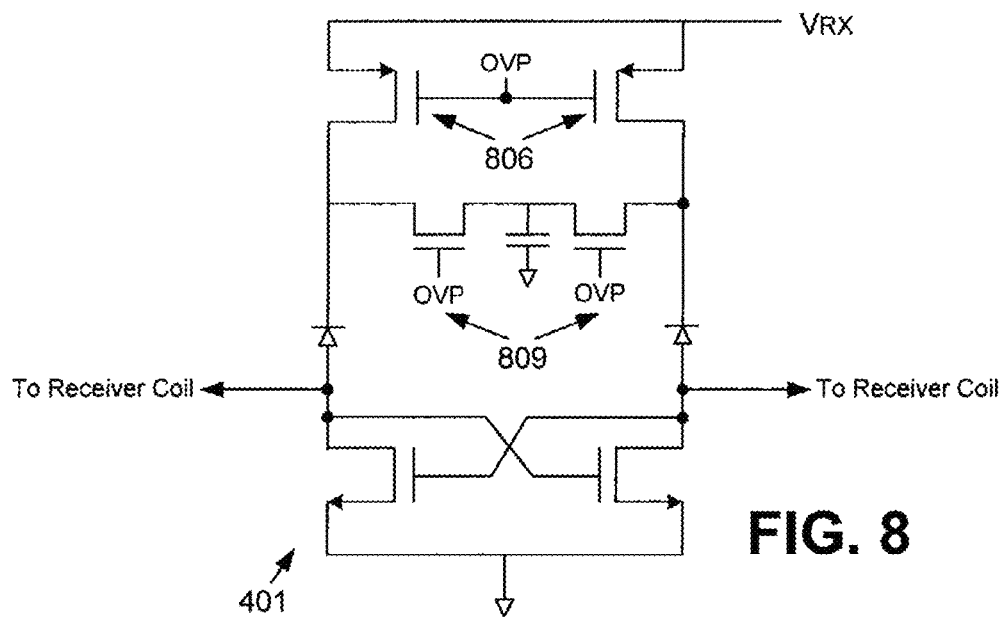
FIG. 8 is yet another drawing of a circuit diagram including a wireless power receiver.

Moving on to FIG. 8, another example of a circuit diagram of a portion of a wireless power receiver 315 that may be configured to receive and/or control power from a wireless power transmitter 321 (FIG. 3) is shown. In the non-limiting example of FIG. 8, a wireless power circuit 401 may include one or more isolation switches 806 that may be employed in overvoltage protection. The functionality of the circuit diagram may be expressed as:

If $V_{RX} > V_{TH}$, Then OVP=High, Else OVP=Low (Eq. 1).

Accordingly, in the event a received voltage exceeds a threshold voltage, the one or more isolation switches 806 (acting as high side switches) may be initiated to turn off the received voltage ($V_{RX}$) from the electromagnetic coil (not shown) within or otherwise coupled to the wireless power receiver 315 until the received voltage ($V_{RX}$) is less than or equal to the threshold voltage ($V_{TH}$). In addition, one or more overvoltage components 809 including transistors and/or MOS-type devices, may be turned on to shunt the current in the wireless power circuit 401. When a received voltage ($V_{RX}$) becomes less than or equal to the threshold voltage ($V_{TH}$), the isolation switches 806 turn on and the overvoltage components turn off, thereby permitting the wireless power circuit 401 to gain voltage from the electromagnetic coil (not shown). The threshold voltage ($V_{TH}$) may be predefined via the components of the circuit or programmatically predefined and may indicate a voltage at which the system may safely operate.

Figure 9:
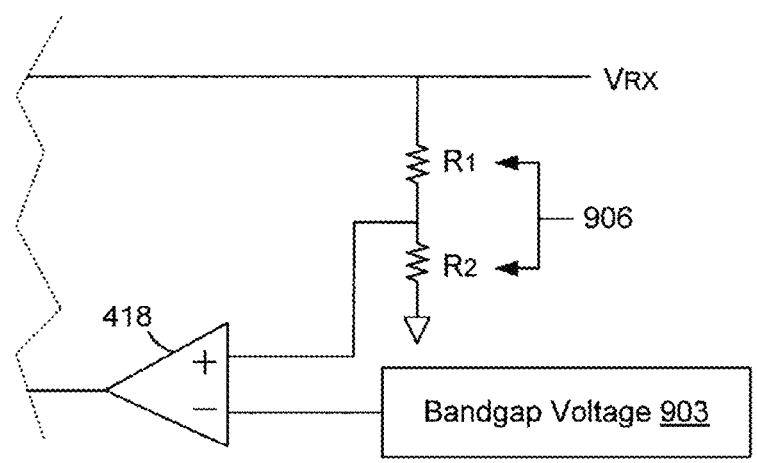
FIG. 9 is a drawing of a circuit diagram that may be employed in the generation of a threshold voltage used in overvoltage protection.

Moving on to FIG. 9, shown is an example of a portion of a circuit diagram that may be employed in the generation of a threshold voltage ($V_{TH}$) used in overvoltage protection according to various embodiments of the present disclosure. As discussed above, a comparator 418 may be employed in various embodiments to compare a received voltage ($V_{RX}$) to a threshold voltage ($V_{TH}$). The comparator 418 is configured to compare two voltages (e.g., $V_{RX}$ and $V_{TH}$) or currents and provide an output indicating which of the two voltages has a greater voltage. A bandgap voltage 903 may be employed to generate a threshold voltage that may indicate a voltage at which a system may safely operate. A system may include, for example, processing circuitry 309 within or otherwise coupled to an electronic device 303 (FIG. 3). As can be appreciated, the bandgap voltage 903 may be temperature independent. The circuit of FIG. 9 may further include one or more resistors 906, as can be appreciated.

Figure 10A:
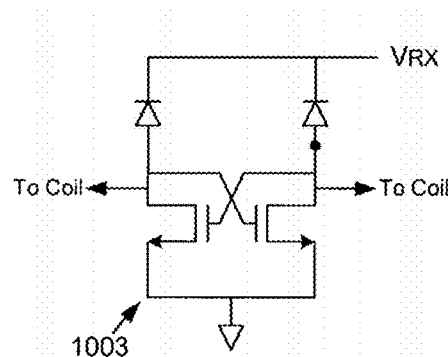
FIGS. 10A-B are drawings of circuit equivalents that may be employed in overvoltage protection.
Figure 10B:
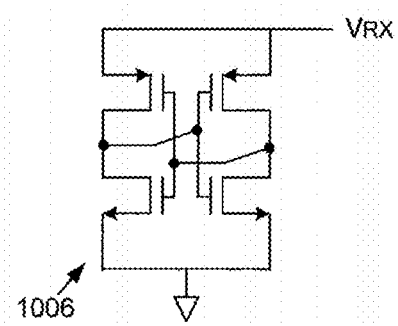

With reference to FIGS. 10A-B, shown are circuit equivalents that may be employed in the embodiments set forth in FIGS. 5-9. As shown in FIG. 10A, a rectification circuit may include an arrangement of one or more transistors 1003 and/or diodes configured to employ overvoltage protection as set forth in the present disclosure. Alternatively, as shown in FIG. 10B, a rectification circuit may include an arrangement of one or more MOS devices 1006 (e.g., PMOS devices and/or NMOS devices) configured to employ overvoltage protection as set forth in the present disclosure.

Figure 11:
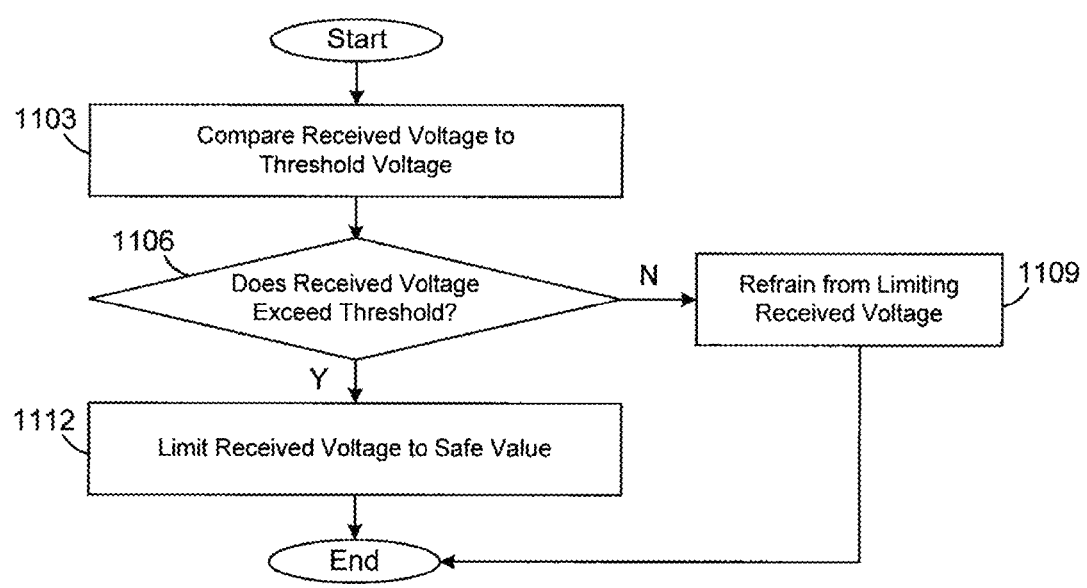
FIG. 11 is a flowchart illustrating one example of functionality implemented in a wireless power receiver.

Referring next to FIG. 11, shown is a flowchart that provides one example of the operation of controlling voltage in a wireless power receiver 315 (FIG. 3). It is understood that the flowchart of FIG. 11 provides merely an example of the many different types of functional arrangements that may be employed to implement the operation of the portion of the wireless power receiver as described herein. The flowchart of FIG. 11 may be viewed as depicting an example of steps of a method implemented in the wireless power receiver according to one or more embodiments.

Beginning with step 1103, a wireless power receiver 315 may be configured to compare a voltage received in the wireless power receiver to a threshold voltage. A threshold voltage may include, for example, a voltage indicating the voltage capabilities of an electronic device such as a portable device 106 (FIG. 1). The threshold voltage ($V_{TH}$) may be predefined via the components of the circuit or programmatically predefined and may indicate a voltage at which the system may safely operate, as discussed with respect to FIG. 9. According to various embodiments of the present disclosure, a comparator 418 may be employed to compare the voltage received in the wireless power receiver 315 to a predefined threshold voltage. The comparator 418 is configured to compare two voltages (e.g., $V_{RX}$ and $V_{TH}$) or currents and provide a hysteretic output indicating which of the two voltages has a greater voltage.

At step 1106, it is determined in the wireless power receiver 315 whether the received voltage exceeds the threshold voltage. As may be appreciated, the comparator 418 is configured to compare the received voltage ($V_{RX}$) with the threshold voltage ($V_{TH}$) and provide an output responsive to which of the two voltages has a greater voltage.

If the received voltage does not exceed the threshold voltage, the wireless power receiver 315 may be configured to refrain from limiting the received voltage at step 1109. For example, the wireless power receiver 315 may refrain from affecting the received voltage ($V_{RX}$). Alternatively, at step 1112, if the received voltage exceeds the threshold voltage, the wireless power receiver 315 may be configured to limit the received voltage to a particular voltage. For example, the received voltage may be limited to be less than or equal to a threshold voltage indicating the voltage capabilities of a device.

Limiting the received voltage ($V_{RX}$) to be less than or equal to a threshold voltage ($V_{TH}$) may be accomplished according to various implementations discussed in the present disclosure. For example, one or more diodes, transistors, and/or MOS-type devices may be employed to shunt a current ($i_{RX}$) generated from a voltage induced in an electromagnetic coil 506 (FIG. 5) within or otherwise coupled to the wireless power receiver 315. In other embodiments, the diodes, transistors, and/or MOS-type devices may be put in a high impedance state to reduce the received voltage ($V_{RX}$). In another example, one or more isolation switches 806 (FIG. 8) may be employed to, in effect, disconnect the wireless power receiver 315 from the electromagnetic coil 506 by shorting the electromagnetic coil 506. In yet another embodiment, the electromagnetic coil 506 coupled to the wireless power receiver 315 may be shorted using one or more diodes, transistors, and/or MOS-type devices, thereby negating the effect of the electromagnetic coil 506 on the wireless power receiver 315.

In the previous implementations, the overvoltage protection for the wireless power receiver 315 is performed through an operation of shorting AC positive (ACP) and AC negative (ACN) lines to ground via the overvoltage components 609 and 612 in response to the $V_{RX}$ node being detected as being above the threshold voltage $V_{TH}$. In this case, the receiver side of the coil 506 is disabled so as to protect a device that might be connected to the $V_{RX}$ node. Once the $V_{RX}$ node returns to a value that is less than the threshold voltage $V_{TH}$, the overvoltage protection components 609 and 612 (see e.g., FIG. 6) are released from a voltage suppression mode so that the coil 506 is returned to an operational state. As recognized by the present inventors, while in the voltage suppression mode, the ability to convey digital information (via impedance load modulation) back to the power transmission side is limited due to the ACP/ACN lines being shunted to ground. In the implementations that follow, the wireless power receiver 315 is configured to permit voltage limiting during an overvoltage condition while simultaneously enabling digital communications from the wireless power receiver 315 to the wireless power transmitter 321 that reports an overvoltage condition to the wireless power transmitter 321.

Figure 12:
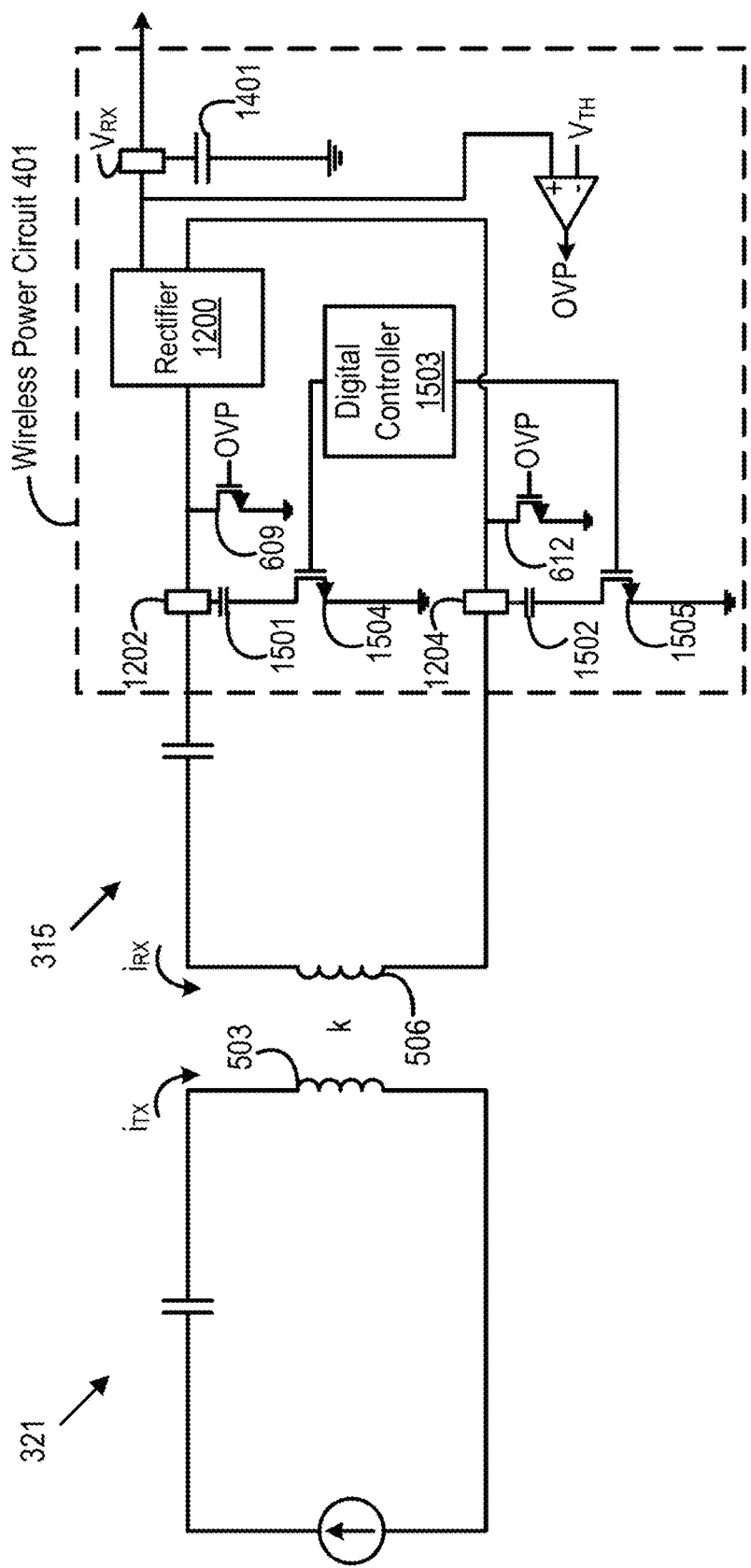
FIG. 12 is a block diagram of an exemplary controller circuitry used to control the voltage suppression operation.

FIG. 12 is another circuit diagram of a wireless power receiver and wireless power transmitter that allows for output voltage suppression while simultaneously communicating the overvoltage condition to a transmitter. The diagram of the wireless power receiver 315 shown in FIG. 12 is similar to the structure shown in FIG. 6 but also includes a rectifier 1200 implemented with processor-controlled or state machine controlled FETs. The rectifier 1200 allows $V_{RX}$ to be suppressed while simultaneously allowing the ACN and ACP lines to function normally in the overvoltage condition, which enables the wireless power receiver 315 to perform continuous load modulation communications with the wireless power transmitter 321.

In addition, an accumulation capacitor 1401 is connected to the $V_{RX}$ node of the wireless power receiver 315. The accumulation capacitor 1401 accumulates charge provided by the rectifier 1200 and upon which the voltage on the $V_{RX}$ node is developed. When one or more of the FETs of the rectifier 1200 are set in a shunt position, a portion of the charge developed on the accumulation capacitor 1401 is shunted to ground, thus reducing the voltage on the $V_{RX}$ node. In this way, the voltage can be controlled while still allowing communications via load modulation to the transmitter. This communication is still possible because the FETs are placed in the shunt position for short periods of time (e.g., not greater than 25%, but more typically 10% or less) of the clock period for the wireless power transmitter 321. Thus, when the shunt bursts are set to be relatively short compared to the transmission clock, the transmission circuitry does not notice the short shunt periods, thus allowing for the continuing digital communication between the receiver and transmitter on opposite sides of the transformer. In some implementations, the rate of voltage reduction at the $V_{RX}$ node is based on the rate of discharge of the accumulation capacitor 1401. Without the accumulation capacitor 1401, shunting the one or more FETs of the rectifier 1200 would result in an immediate drop of the rectified voltage $V_{RX}$ to zero, which would limit the ability of the wireless power receiver 315 to communicate the overvoltage condition to the wireless power transmitter 321.

The continuous load modulation communications with the wireless power transmitter 321 during the overvoltage condition can be achieved by way of shunting charge off the $V_{RX}$ node in short bursts or pulses, where a time length of the short pulses are a fraction (e.g., one tenth) of a clock period that the wireless power transmitter 321 uses to clock communications. In an exemplary implementation, the transmitter clock complies with Wireless Power Consortium (WPC) and Power Matters Alliance (PMA) standards in a range of 100 kilohertz (kHz) to 500 kHz. As such, the rectifier 1200 actively controls the voltage accumulated on $V_{RX}$ for short periods of time (maximum of one microsecond shunt periods, although 1000 to 100 nanosecond shunt periods may be used as well). In another implementation, the continuous load modulation communications with the wireless power transmitter 321 during the overvoltage condition can also be achieved by shunting the charge off the $V_{RX}$ node by routing a discharge current through one or more FET segments of rectifier switches of the rectifier 1200. Details regarding the rectifier 1200 are discussed further herein.

Suppression of the output voltage by applying shunt control signals to one or more switches of the rectifier 1200 allows for not only suppressing the output voltage, but doing so while a load modulation communication system connected to the ACP/ACN lines of the wireless power receiver 315 continues to communicate with the wireless power transmitter 321. By receiving the digital communications from the wireless power receiver 315 during the overload condition, the wireless power transmitter 321 can be informed that the overvoltage condition has occurred at the wireless power receiver 315 so that wireless power transmitter 321 can modify the voltage transmitted to the wireless power receiver 315. The load modulation communication system can include capacitor 1501 connected to ACP terminal 1202, capacitor 1502 connected to ACN terminal 1204, and a digital controller 1503 that is configured to control a capacitance of the capacitors 1501 and/or 1502 via one or more switches. For example, the capacitors 1501 and 1502 are connected in series to FETs 1504 and 1505 that are connected to and controlled by the digital controller 1503. The digital controller 1503 can modify the capacitance of the capacitor 1501 and/or capacitor 1502 by controlling switching of FET 1504 and/or 1505 connected in series with the capacitors 1501 or 1502. For example, the digital controller 1503 can communicate a digital one to the wireless power transmitter 321 by increasing the capacitance of the capacitors 1501 and/or 1502 to greater than a predetermined capacitance. Likewise, a digital zero can be communicated to the wireless power transmitter 321 by decreasing the capacitance of the capacitors 1501 and/or 1502 to be less than or equal the predetermined capacitance.

In other implementations, a variety of different capacitors may be switched in or out under control of the digital controller 1503 so that multi-level signaling may be used. Moreover, by performing load modulation by effectively adding capacitors to the AC terminals 1202 and 1204, the wireless power transmitter 321 recognizes increased capacitance as a digital one, and lesser capacitance as a digital zero.

As yet a further alternative, the structure shown in FIG. 12 can be modified so that the FETs 609 and 612 can be substituted for current sources so as to prevent a hard short of the ACP/ACN lines to ground. In addition, the FETs 609 and 612 can be implemented with the low side rectifier FET 606. In this alternative configuration, communications from the wireless power receiver 315 to the wireless power transmitter 321 via load modulation as well simultaneously performing $V_{RX}$ voltage control.

Figure 13:
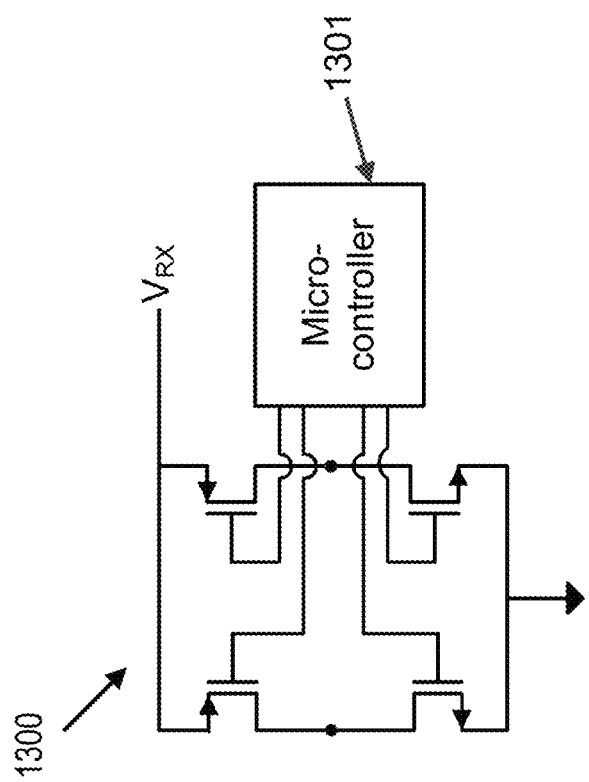
FIG. 13 shows an exemplary rectifier with FET dates controlled individually or in combination by a microcontroller.

FIG. 13 is an exemplary rectifier 1300, which is an implementation of the rectifier 1200 in the wireless power receiver 315. Instead of having switches with hardwired gate connections like that shown in FIG. 10B, for example, the rectifier 1300 has one or more switches (FETs) with gates that are controlled by a microcontroller or digital state machine controller 1301. In some implementations, the microcontroller 1301 is a separate component from the digital controller 1503, but in other implementations, one or more software processes performed by the digital controller 1503 and the microcontroller 1301 can be performed by a processor of a single controller (e.g., microcontroller 412) included as part of the wireless power receiver 315, such as the processing circuitry 309. By having one or more of the FETs shown in the rectifier 1200 controlled by the microcontroller 1301, charge can be shunted from the $V_{RX}$ node to ground as the FETs are cycled on and off by the microcontroller 1301. For example, the microcontroller 1301 can output gate control pulses to the gates of the FETs of the rectifier 1200 to turn the FETs on and off. In the present example, if the rate and turn-on duration of the one or more gates of the FETs is set to be less than or equal to one-tenth of the clock rate of the field clock for controlling transmissions to the wireless power transmitter 321, there is not a noticeable negative effect on data detection rate at the wireless power transmitter 321. Also, the amount of time that the FETs are shunted to ground corresponds to a predetermined amount of reduction in the rectified voltage $V_{RX}$ so that the reduced rectified voltage after the gate control pulse is applied is less than the voltage threshold $V_{TH}$. In addition, the microcontroller 1301 can determine how many of the FET segments of the rectifier to turn on and off based on a magnitude of the voltage at the $V_{RX}$ node. For example, as the magnitude of the voltage at the $V_{RX}$ node increases, the microcontroller 1301 can shunt a greater number of the rectifier FET segments to ground.

Moreover, by setting the period of time when FETs are set in the shunt position (e.g., switches are turned on), relative to the transmitter clock period, to a relatively small percentage (e.g., 10% or less), the voltage developed on the $V_{RX}$ node can be controlled while still allowing for continuous capacitor (impedance) modulation of the capacitors 1501 and/or 1502 by the digital controller 1503. The continuous capacitor modulation allows for communicating the overvoltage condition to the wireless power transmitter 321 so the wireless power transmitter 321 can take corrective action. While FIG. 13 shows the microcontroller 1301, a digital state machine implementation in circuitry may be used as an alternative.

By way of comparison, the structure of the rectifier 1300 shown in FIG. 13 allows for individual control of the FETs, while the structure shown in FIG. 10B essentially is a self-clocked implementation of the rectifier 1006, where the AC inputs are connected to the middle nodes of the rectifier 1006. In the implementation where the structure of the rectifier 1300 corresponds to that of the rectifier 1006 in FIG. 10B, overvoltage protection can be implemented by the microcontroller 1301 by way of a circuit that overrides the self-clocking inputs to the FETs during the overvoltage condition. In addition, the rectifier 1300 can have any structure that allows the micro-controller 1301 to reduce the $V_{RX}$ node voltage by shunting one or more of the switches of the rectifier 1300 to ground for short periods of time by outputting gate control pulses to the gates of the switches.

Figure 14:
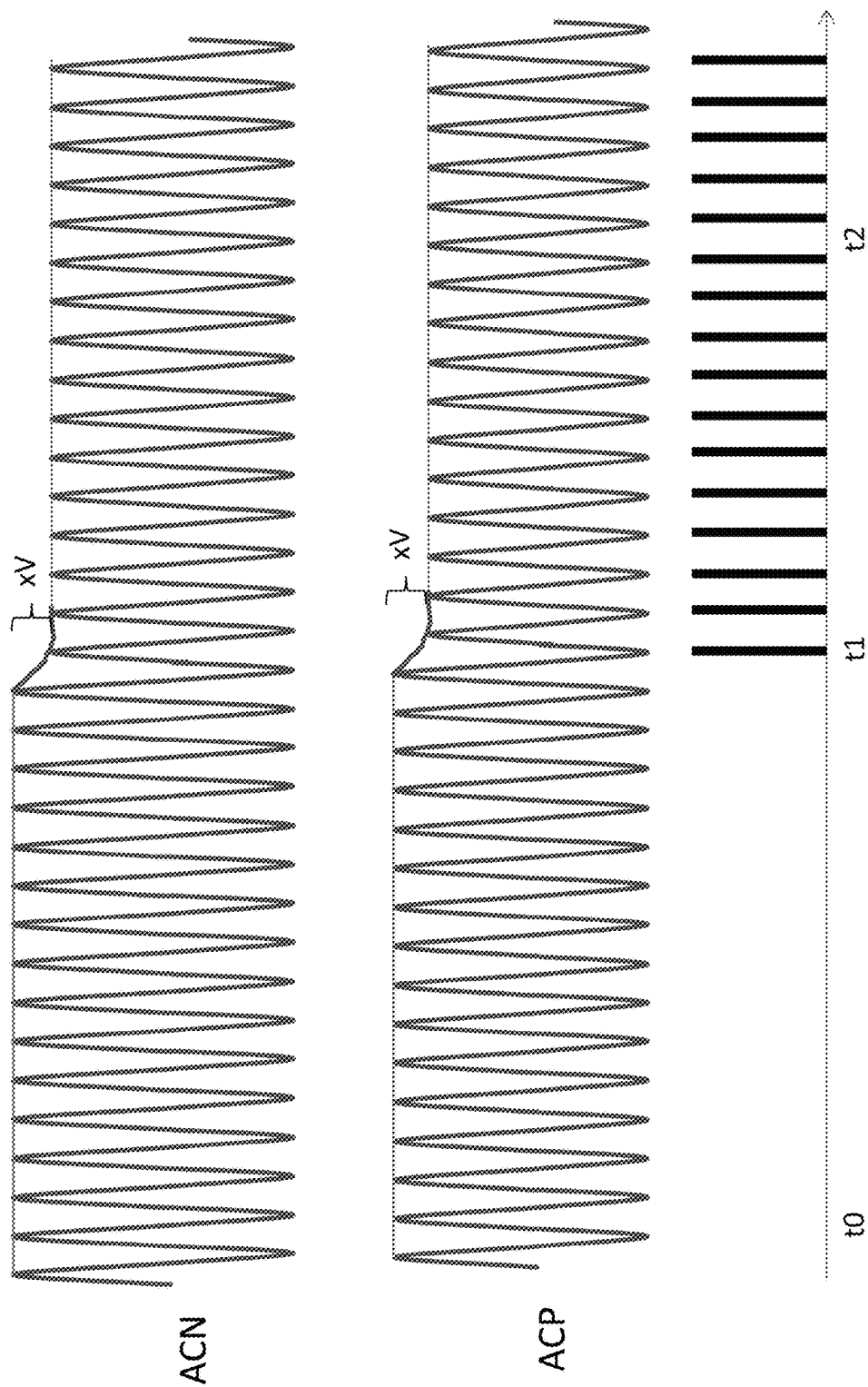
FIG. 14 is a timing diagram for a voltage suppression operation.

FIG. 14 shows exemplary waveforms for the ACP line, ACN line and gate control pulses that control short intervals of charge-shunting off the $V_{RX}$ node of the wireless power receiver 315. In an exemplary implementation where the gates of the FETs of the rectifier 1300 are controlled by the controller 1301, the voltage levels on ACN and ACP lines change by a voltage difference of xV. The drop in voltage occurs when the gates are driven with control pulses output from the controller 1301, as shown in the bottom waveform of FIG. 14. Moreover, the top waveform of FIG. 14 shows an exemplary voltage present on ACN line, the middle waveform shows an exemplary voltage on the ACP line, and the bottom waveform shows the gate control pulses that are applied to the gates of FETs of the rectifier 1300.

On the gate control pulse waveform at time t0, no control pulses are output from the microcontroller 1301 to the gates of the FETs of the rectifier 1300, and the rectifier 1300 operates in a rectification mode as if the gates of the rectifier FETs are tied together (as shown in FIG. 10B). In some implementations, the rectification mode is implemented when the voltage at the $V_{RX}$ node is less than or equal to the threshold voltage $V_{TH}$.

At time t1, the controller 1301 applies a short pulse is the respective gates of the rectifier FETs so as to place the FETs in a voltage suppression mode such that current is drawn off of the accumulation capacitor 1401 at the $V_{RX}$ node and the voltage is drawn down by the voltage difference xV. The pulses are started at time t1, which corresponds to when a voltage overload condition is detected and the microcontroller 1301 attempts to reduce the output voltage by actively shunting charge off the $V_{RX}$ node. Successive pulses are applied to the gates (one, two, three or all four gate segments, depending on the amount of charge to be drawn off) at predetermined intervals, which in this example is no longer than one tenth of the period of the clock used to govern data communications by the wireless power transmitter 321. In an exemplary embodiment, the transmit frequency operates in a range of 100 kHz to 500 kHz.

Depending on the actual transmit frequency, the period of the pulses in the control waveform can be set in a wide range, provided that the duration of the pulses do not exceed 25%, but more typically not longer than 10% of a cycle time for the ACN or ACP waveforms. A typical ratio of time for a period of the ACN/ACP waveform to the pulse width for the control pulses range between 10 to 100 times. This ratio ensures that the period of time that the rectifier FETs are in the shunted position is sufficiently small so that communications may still be effectively carried out with the wireless power transmitter 321 without interfering with the ability of the wireless power transmitter 321 to effectively detect the load modulation that may occur as current flows through the coil. In the voltage suppression mode that is implemented when the overvoltage condition exists, the waveform envelope exhibits a ripple, with the low portions coinciding with the control pulses and the high portions coinciding with the intervals between the control pulses.

In some implementations, in response to receiving the communications from the wireless power receiver 315 indicating that the wireless power receiver 315 is in the overvoltage condition, the wireless power transmitter 321 may reduce a magnitude of the generated magnetic flux to a predefined level and/or a level defined in the communication that results in the rectified voltage $V_{RX}$ being reduced to less than the threshold voltage. For example, the microcontroller 1301 may receive sensor data from at least one voltage sensor on the ACP and/or ACN lines of the wireless power receiver 315 that indicate that the overvoltage condition has cleared due to a reduction in the magnitude of a wirelessly induced voltage at the wireless power receiver 315. If the microcontroller 1301 determines that the overvoltage condition has cleared, then the microcontroller 1301 can transition back to the rectification mode of operation for the rectifier 1200.

Figure 15:
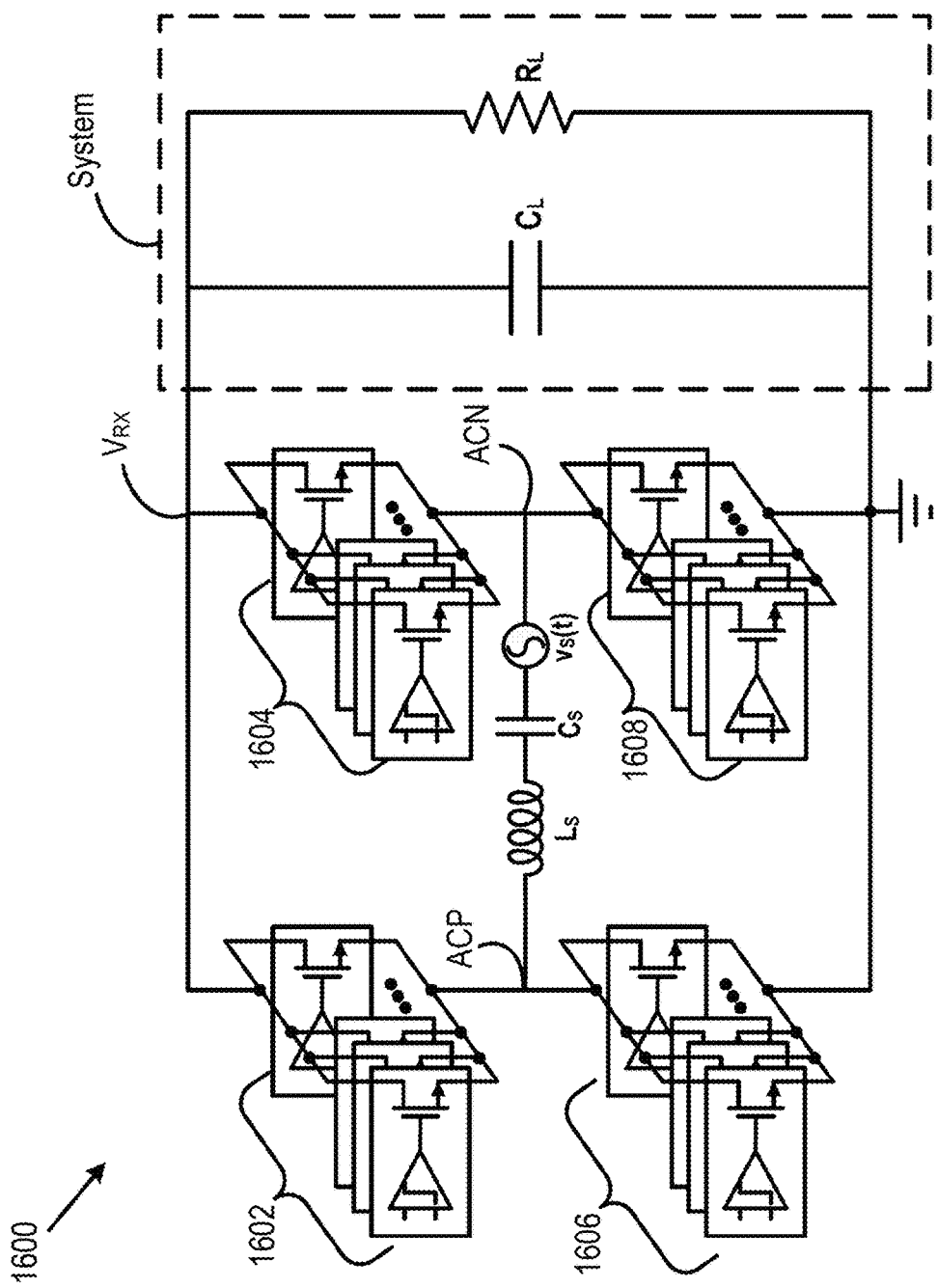
FIG. 15 is an exemplary schematic diagram of a rectifier.

FIG. 15 is an exemplary schematic diagram of a synchronous rectifier 1600, which is an implementation of the rectifier 1200 in the wireless power receiver 315 shown in FIG. 12. The diagram of the rectifier 1600 depicts an H-bridge with a voltage source $v_S(t)$, capacitor $C_S$, and inductor $L_S$ between ACP and ACN nodes that includes switches 1602, 1604, 1606, and 1608. It can be understood that the H-bridge is not physically connected between the ACP and ACN nodes but rather the components of the H-bridge are equivalent components that represent coupling characteristics of the coil 506 of the wireless power receiver 315 and may not be actual circuit components. For example, the voltage source $v_S(t)$ represents an incoming voltage at the coil 506, and capacitor $C_S$ and inductor $L_S$ represent the equivalent resonant components at rectifier input ACP and ACN. Throughout the disclosure, any depiction of an H-bridge with $v_S(t)$, $C_S$, and $L_S$ between the ACP and ACN nodes of the rectifier can be understood to be equivalent resonant components representing functional characteristics of the coil 506 and input capacitor. The switches 1602, 1604, 1606, and 1608 can be FETs that are made up of FET segments with corresponding comparators connected in parallel, which provides for increased programmability of the rectifier 1600. For example, the rectifier 1600 can operate in a rectification mode or a voltage suppression mode based on how the FET segments of the switches 1602, 1604, 1606, and 1608 are configured. In one implementation, the switches 1602, 1604, 1606, and 1608 include eight parallel-connected FET segments, also referred to as FET slices, but the switches 1602, 1604, 1606, and 1608 can also include greater or fewer numbers of FET segments.

When operating in the rectification mode, the switches 1602, 1604, 1606, and 1608 are configured to convert an AC current from the coil 506 of the wireless power receiver 321 into a DC current at the rectified voltage $V_{RX}$ to be supplied to the system represented by load resistance $R_L$ and capacitance $C_L$. When operating in the voltage suppression mode, one or more of the FET segments in one or more of the switches 1602, 1604, 1606, and 1608 can be configured to drain some of the charge at the $V_{RX}$ node to ground to reduce the rectified voltage $V_{RX}$ while the remaining FET segments continue to operate in the rectification mode. Details regarding configuring the FET segments for the voltage suppression mode are discussed further herein.

Figure 16:
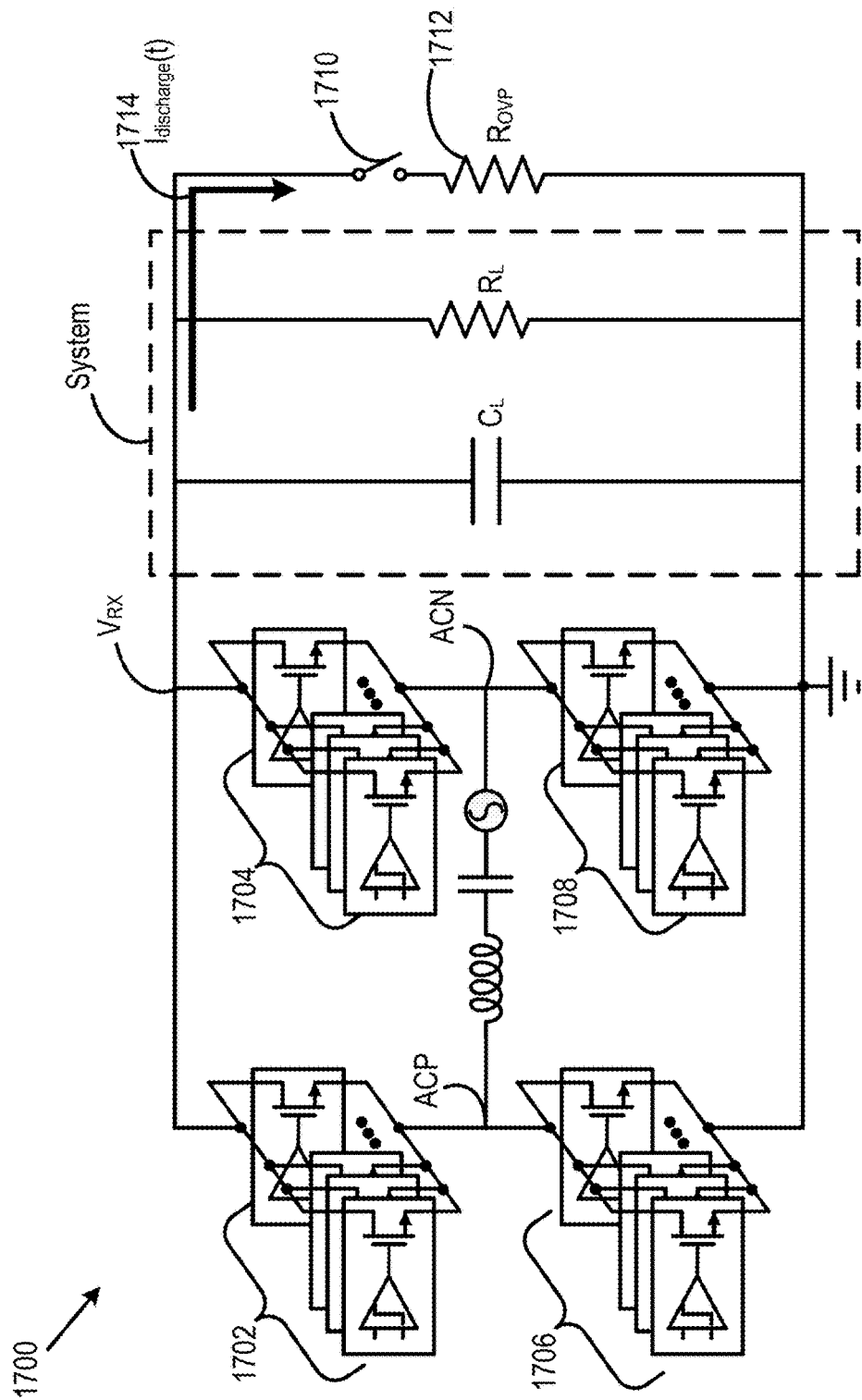
FIG. 16 is an exemplary schematic diagram of a rectifier.

FIG. 16 is an exemplary schematic diagram of a rectifier 1700, which is also an implementation of the rectifier 1200 in the wireless power receiver 315 shown in FIG. 12. The rectifier 1700 is structurally and functionally similar to the rectifier 1600 and is a synchronous rectifier. The rectifier 1700 supplies a DC rectified voltage $V_{RX}$ to the system represented by load resistance $R_L$ and capacitance $C_L$ and can also provide OVP. The rectifier 1700 that includes switches 1702, 1704, 1706, and 1708. The switches 1702, 1704, 1706, and 1708 can be FETs that are made up of parallel-connected FET segments. The rectifier 1700 includes a discharge path for current $I_{discharge}(t)$ 1714 to reduce the rectified voltage $V_{RX}$ during an overvoltage condition that includes a switch 1710 and OVP resistor ($R_{OVP}$) 1712. When the rectified voltage is greater than a threshold voltage $V_{TH}$, which is also referred to as the overvoltage condition, the switch 1710 is shut, and the current 1714 is discharged through the OVP resistor 1712. When the overvoltage condition clears the rectified voltage $V_{RX}$ is less than the threshold voltage $V_{TH}$, then the switch 1710 may be opened. The position of switch 1710 can be controlled based on control signals output from the microcontroller 412.

Figure 17:
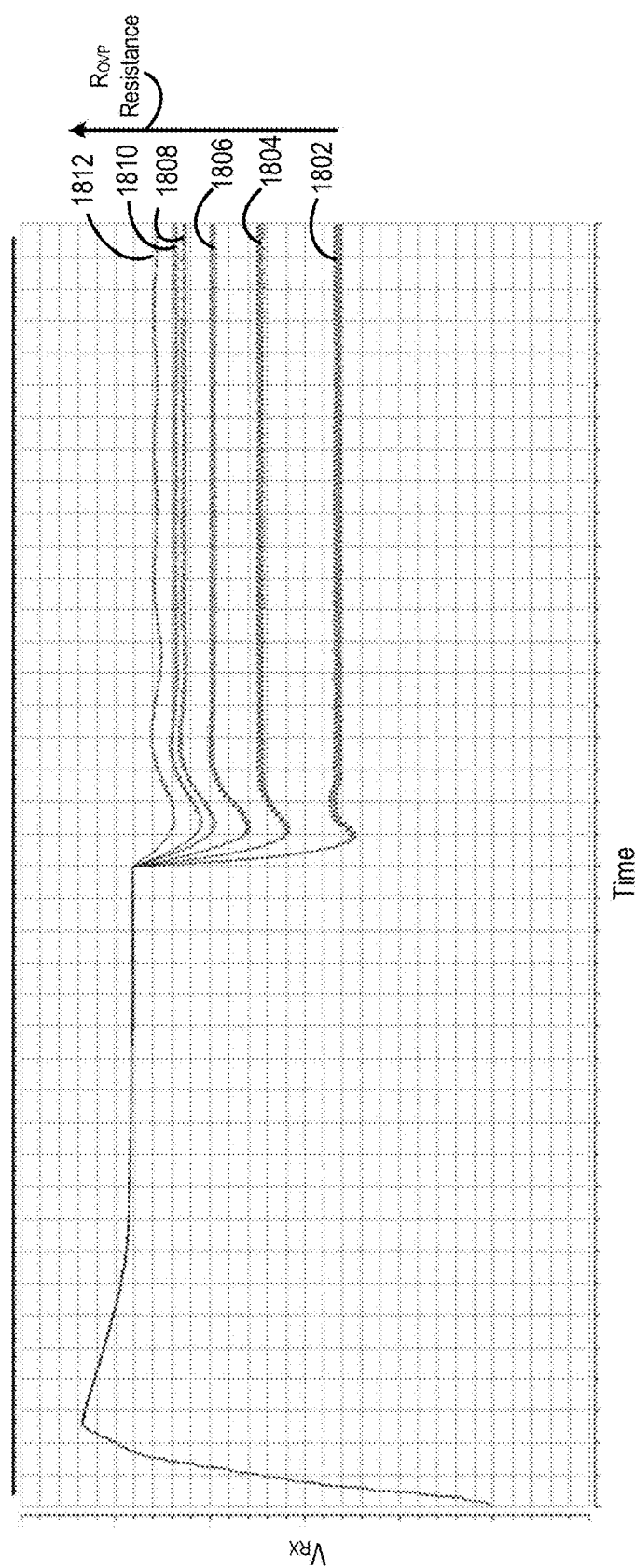
FIG. 17 is an exemplary graph of rectified voltage with respect to time.

When the switch 1710 is shut, and the current 1714 is discharged through the OVP resistor 1712, which results in a reduction in the rectified voltage $V_{RX}$ that resembles the voltage reduction at the ACP and ACN nodes as depicted previously in FIG. 14. FIG. 17 is another exemplary graph of the rectified voltage $V_{RX}$ of the rectifier 1700 with respect to time that shows the effect various resistance values of the OVP resistor 1712 has on reducing the rectified voltage $V_{RX}$ during the overvoltage condition. The graph shows the rectified voltage $V_{RX}$ curves 1802, 1804, 1806, 1808, 1810, and 1812 for successively increasing OVP resistor resistances where curve 1802 is associated with a lowest resistance and curve 1812 represents a highest resistance. As the resistance of the OVP resistor 1712 decreases, the current 1714 increases, which results in a greater reduction in the rectified voltage $V_{RX}$ over a shorter period of time, which can also be referred to as a stronger pull-down path.

Figure 18:
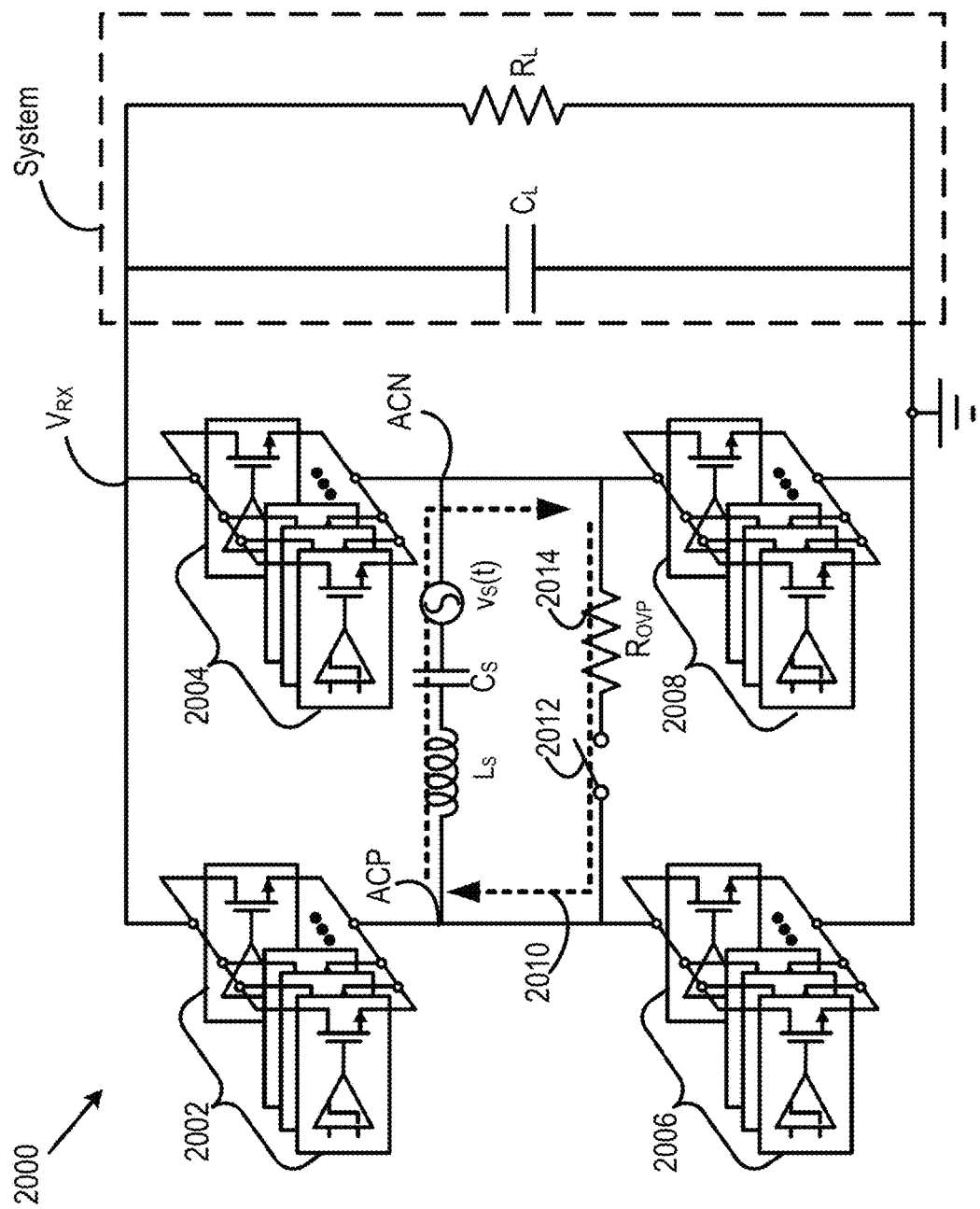
FIG. 18 is an exemplary schematic diagram of a rectifier.

FIG. 18 is an exemplary schematic diagram of a rectifier 2000, which is another implementation of the rectifier 1200. As shown in FIG. 18, the rectifier 2000 is a synchronous rectifier that supplies a DC rectified voltage $V_{RX}$ to the system represented by load resistance $R_L$ and capacitance $C_L$ and can also provide OVP. The rectifier 2000 includes switches 2002, 2004, 2006, and 2008 that can be FETs which are made up of parallel-connected FET segments. The rectifier 2000 includes a discharge path for current 2010 in parallel with the H-bridge between the switches 2002, 2004, 2006, and 2008 to reduce the rectified voltage $V_{RX}$ during an overvoltage condition. The discharge path includes a switch 2012 and OVP resistor ($R_{OVP}$) 2014. When the overvoltage condition occurs and the switch 2012 is shut, energy is discharged through the OVP resistor 2014 via the current 2010. When the overvoltage condition clears, then the switch 2012 can be opened. The position of switch 2012 can be controlled based on control signals output from the microcontroller 412.

Figure 19:
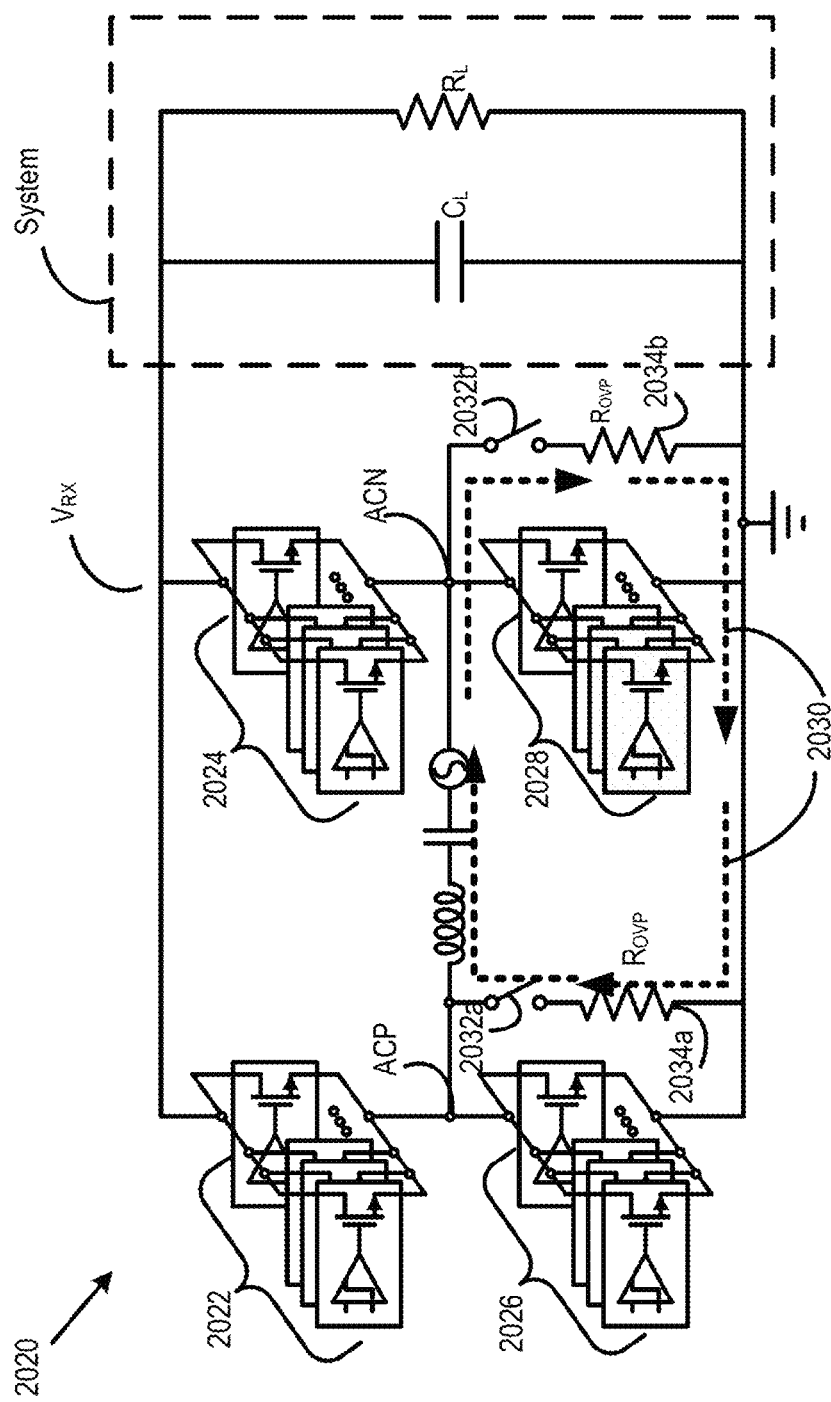
FIG. 19 is an exemplary schematic diagram of a rectifier.

FIG. 19 is an exemplary schematic diagram of a rectifier 2020, which is an equivalent circuit to the rectifier 2000 in FIG. 18. The rectifier 2020 is a synchronous rectifier that supplies a DC rectified voltage $V_{RX}$ to the system represented by load resistance $R_L$ and capacitance $C_L$ and can also provide OVP. The rectifier 2020 includes switches 2022, 2024, 2026, and 2028 that can be FETs which are made up of parallel-connected FET segments. The rectifier 2020 includes two parallel discharge paths for current 2030 in parallel with the switches 2026 and 2028 to reduce the rectified voltage $V_{RX}$ during an overvoltage condition. The discharge paths include a switch 2032a,b and OVP resistor ($R_{OVP}$) 2034a,b. When the overvoltage condition occurs and the switches 2032a,b are shut, the energy is discharged through the OVP resistors 2034a,b via current 2030. When the overvoltage condition clears, then the switches 2032a,b can be opened. The positions of the switches 2032a,b can be controlled based on control signals output from the microcontroller 412.

Figure 20B:
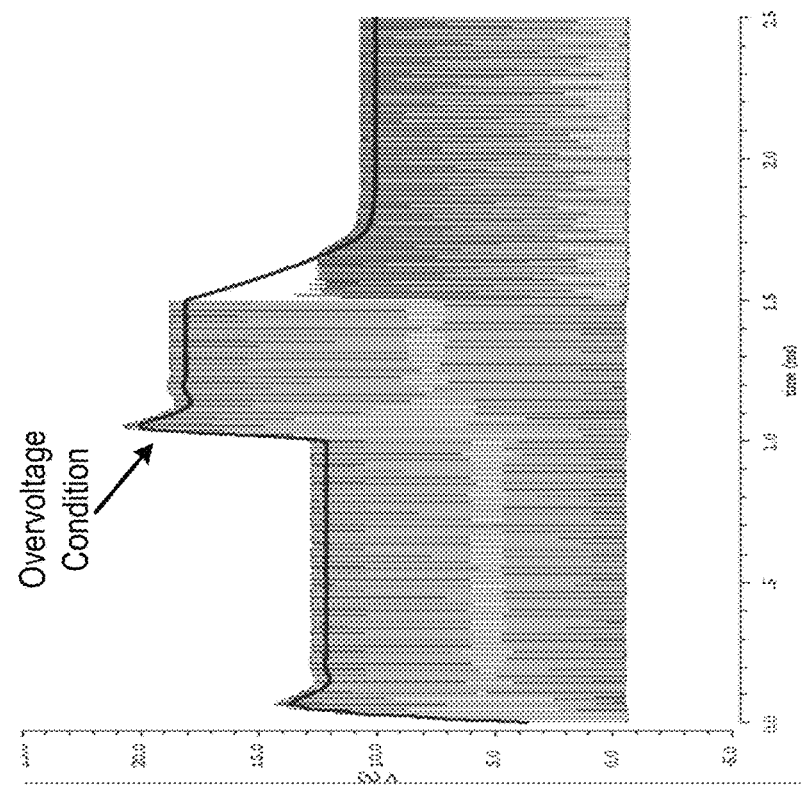
FIG. 20B is an exemplary graph of load modulation in a wireless power receiver.
Figure 20A:
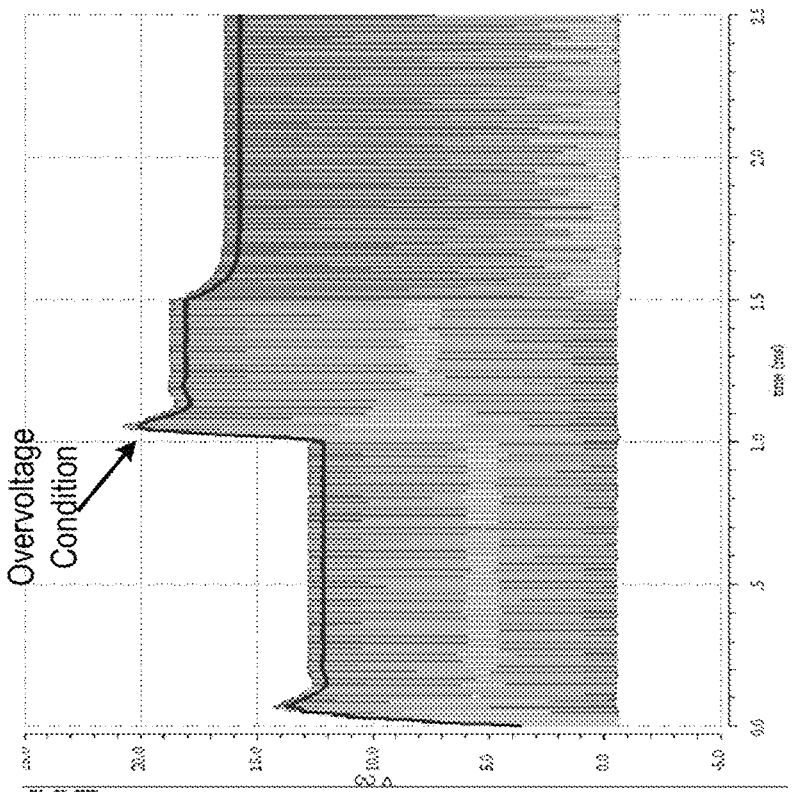
FIG. 20A is an exemplary graph of load modulation in a wireless power receiver.

FIGS. 20A and 20B are exemplary graphs of load modulation in the wireless power receiver 315 during overvoltage conditions where the rectifier 1200 is the rectifier 2020 shown in FIG. 19. The graph in FIG. 20A represents an implementation where the OVP resistors 2034a,b have a resistance value of 10Ω, and the graph in FIG. 20B represents an implementation where the OVP resistors 2034a,b have a resistance value of 2.5Ω. The graphs show the rectified voltage $V_{RX}$ at the wireless power receiver 315 which allows for continuous load modulation communications from the wireless power receiver 315 to the wireless power transmitter 321 via the modulation of the capacitors 1501 and/or 1502 by the digital controller 1503 that communicate the overvoltage condition as discussed previously (FIG. 12). As shown in both of the graphs, at approximately 1.0 ms, an overvoltage condition occurs where the rectified voltage $V_{RX}$ exceeds the threshold voltage $V_{TH}$, and the OVP resistors 2034a,b provide a discharge path for the current 2030 to drain charge from the $V_{RX}$ node while still maintaining continuous load modulation communications with the wireless power transmitter 321. As can be seen by the graphs, the resistance value of 2.5Ω for the OVP resistors 2034a,b shown in FIG. 21B a stronger pull-down path for the rectified voltage $V_{RX}$ than the resistance value of 10Ω for the OVP resistors 2034a,b shown in FIG. 20A.

Figure 21:
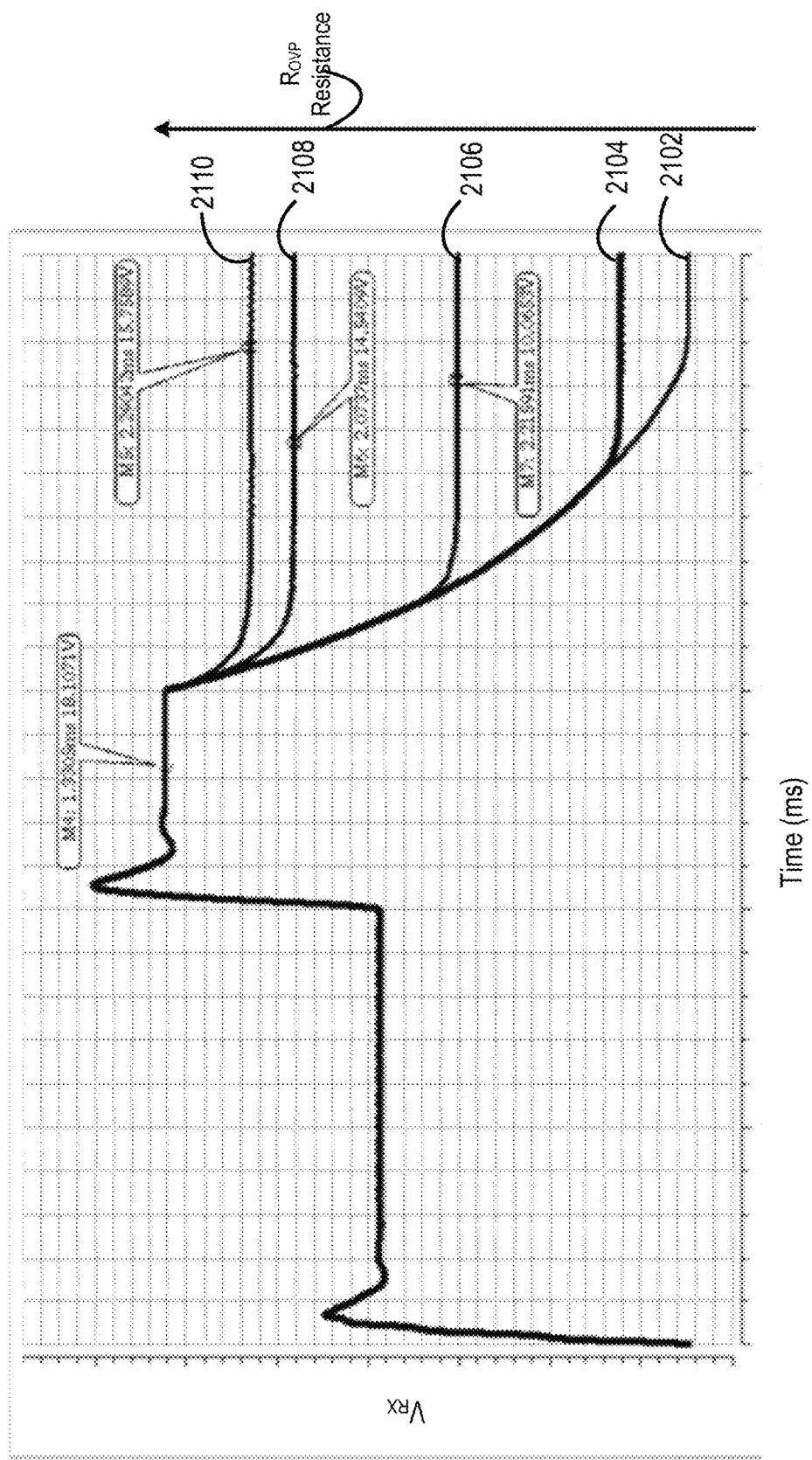
FIG. 21 is an exemplary graph of rectified voltage with respect to time.

FIG. 21 is an exemplary graph of the rectified voltage $V_{RX}$ of the rectifier 2020 with respect to time that shows the effect various resistance values of the OVP resistors 2034a,b have on reducing the rectified voltage $V_{RX}$ during the overvoltage condition. The graphs 2102, 2104, 2106, 2108, and 2110 show the rectified voltage $V_{RX}$ for increasing OVP resistor resistances. As the resistance of the OVP resistors 2034a,b decrease, the current 2030 increases, which results in a stronger pull-down path for the rectified voltage $V_{RX}$ over a shorter period of time.

Figure 22:
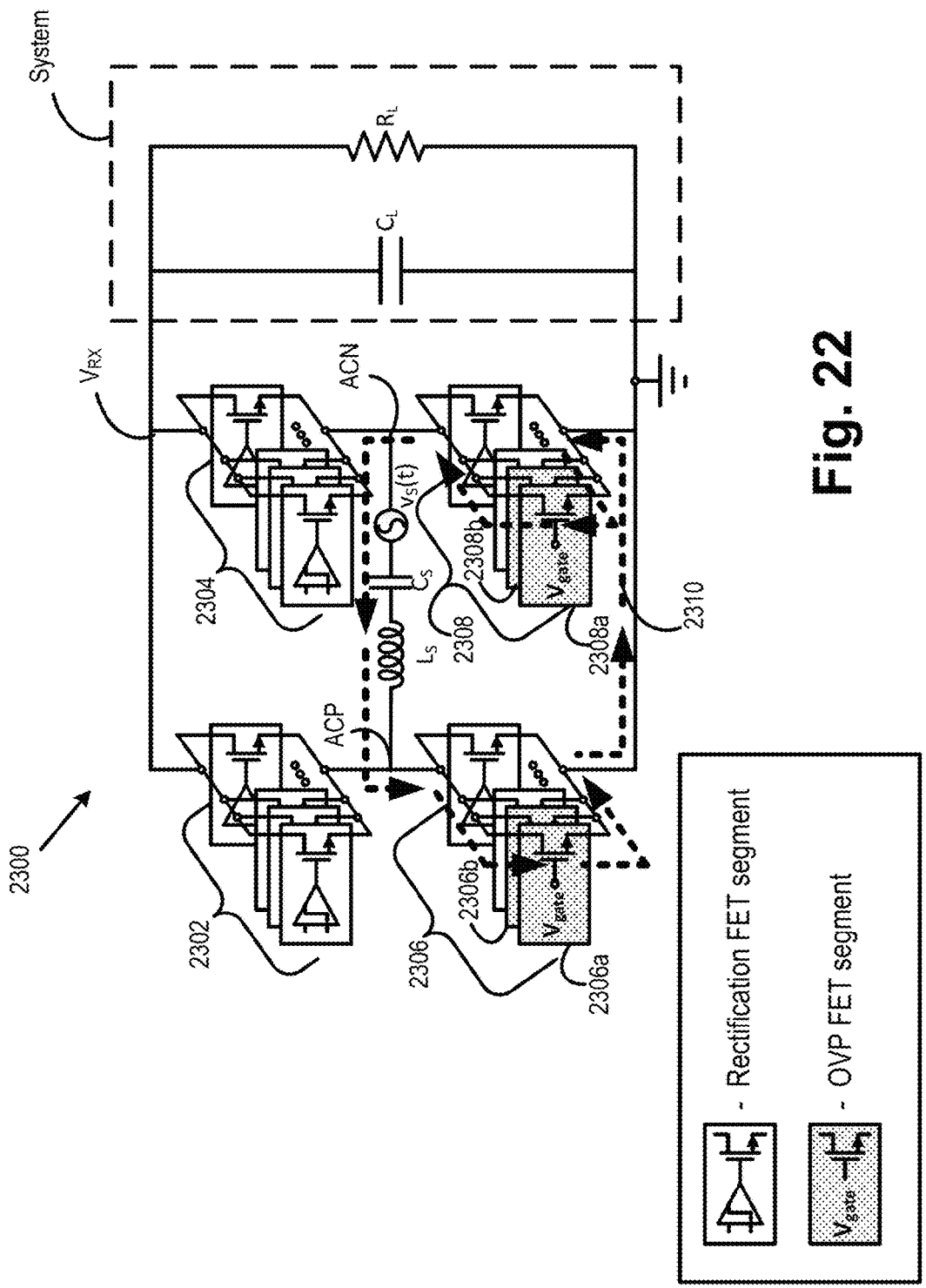
FIG. 22 is an exemplary schematic diagram of a rectifier with individually programmable FET segments.

FIG. 22 is an exemplary schematic diagram of a rectifier 2300, which is an implementation of the rectifier 1200 in the wireless power receiver 315 shown in FIG. 12. The rectifier 2300 is a synchronous rectifier that supplies a DC rectified voltage $V_{RX}$ to the system represented by load resistance $R_L$ and capacitance $C_L$ and can also provide OVP. The rectifier 2300 includes switches 2302, 2304, 2306, and 2308 that can be FETs which are made up of FET segments with corresponding comparators connected in parallel, which provides for increased programmability of the rectifier 2300. For example, the rectifier 2300 can operate in a rectification mode or a voltage suppression mode based on how the FET segments of the switches 2302, 2304, 2306, and 2308 are configured. In one implementation, the switches 2302, 2304, 2306, and 2308 include eight parallel-connected FET segments, also referred to as FET slices, but the switches 2302, 2304, 2306, and 2308 can also include greater or fewer numbers of FET segments.

When operating in the rectification mode, the switches 2302, 2304, 2306, and 2308 are configured to convert an AC current from the coil 506 of the wireless power receiver 321 into a DC current at the rectified voltage $V_{RX}$ to be supplied to the system. When operating in the voltage suppression mode, one or more of the FET segments in one or more of the switches 2302, 2304, 2306, and 2308 can be configured to drain some of the charge at the $V_{RX}$ node to ground to reduce the rectified voltage $V_{RX}$ while the remaining FET segments continue to operate in the rectification mode. For example, FET segments 2306a,b from the switch 2306 and FET segments 2308a,b from the switch 2308 can be configured to provide a an energy discharge path via current 2310, which causes the charge to drain from the $V_{RX}$ node. In effect, the FET segments 2306a,b and 2308a,b provide the shunting current 2310 that is equivalent to the shunting current 2030 that discharges through the OVP resistors 2034a,b in the rectifier 2020 (FIG. 19).

The configuration of the FET segments of the switches 2302, 2304, 2306, and 2308 can be individually controlled based on control signals output from the microcontroller 412 or another control circuit in the wireless power receiver 315. In some implementations, the microcontroller 412 can configure one or more of the FET segments for the voltage suppression mode by directly controlling a gate voltage of one or more of the FET segments, which corresponds to an amount of effective OVP resistance which the remaining FET segments of the switches 2306 and 2308 are configured for rectification of the AC current from the coil 506 into a DC current at the rectification node $V_{RX}$. For example, controlling the gate voltages of FET segments 2306a,b and 2308a,b in a range from approximately 1.5 Volts (V) to 2 Volts corresponds to an effective OVP resistance of approximately 3Ω. As the gate voltages of the switches are increased, the effective OVP resistance decreases, which results in an increased current 2310 that reduces the rectified voltage $V_{RX}$ more quickly. The effective OVP resistance associated with the FET segments of the switches 2306 and 2308 can also be modified by increasing or decreasing the number of FET segments that are configured for OVP. For example, increasing the number of FET segments of the switches 2306 and 2308 that are configured for the voltage suppression mode also decreases the effective OVP resistance.

Figure 23:
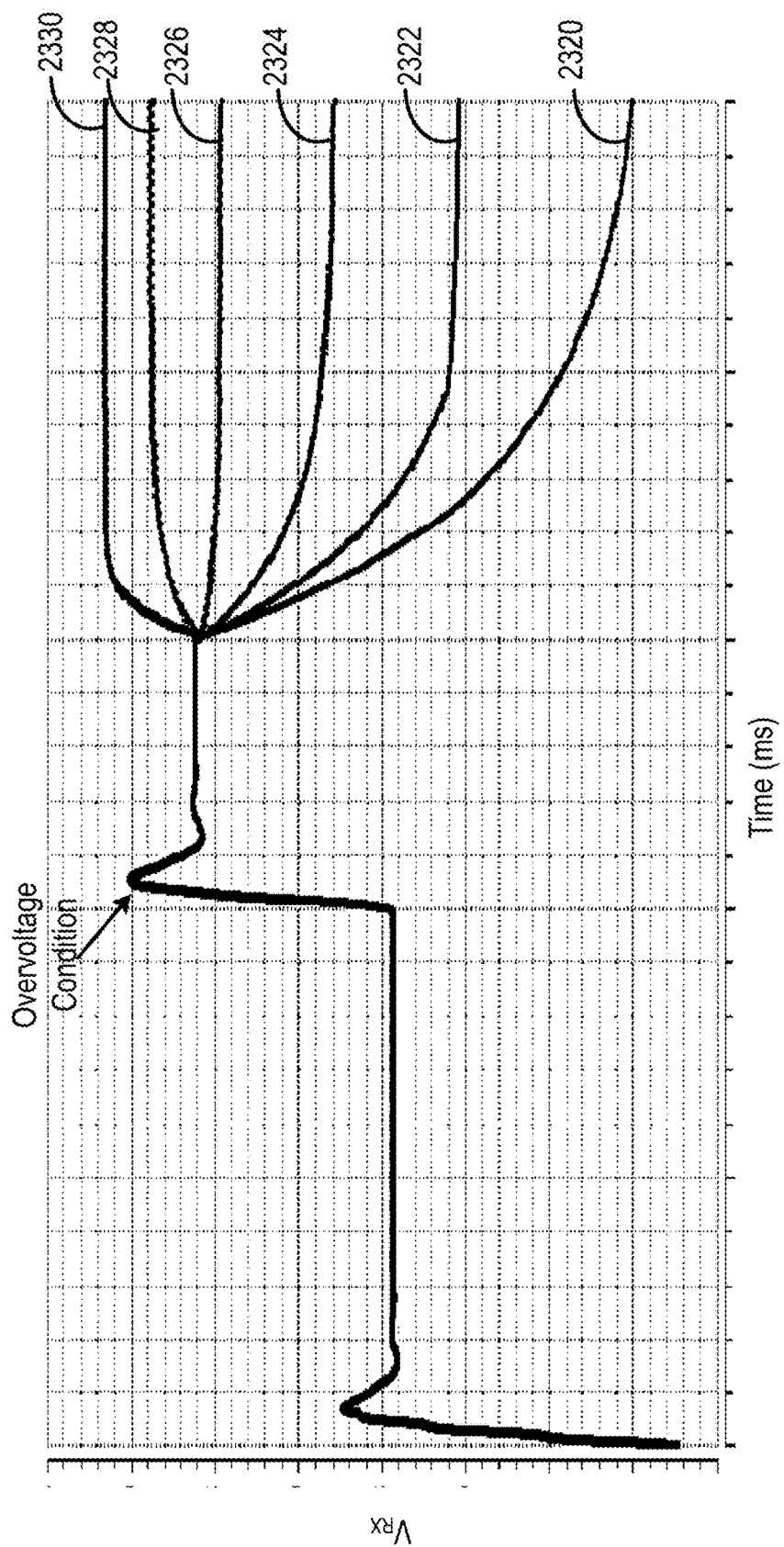
FIG. 23 is an exemplary graph of rectified voltage with respect to time.

FIG. 23 is an exemplary graph of the rectified voltage $V_{RX}$ of the rectifier 2300 with respect to time that shows the effect of gate voltages applied to the FET segments 2306a,b and 2308a,b on reducing the rectified voltage $V_{RX}$ during the overvoltage condition. The graph shows curves 2320, 2322, 2324, 2326, 2328, and 2330 which depict the rectified voltage $V_{RX}$ associated with various gate voltages. For example, the gate voltage applied to the FET segments 2306a,b and 2308a,b decreases between curves 2320 and 2330 such that the gate voltage associated with curve 2330 is a lowest gate voltage and curve 2320 is a highest gate voltage. As the gate voltage applied to FET segments 2306a,b and 2308a,b is increased, the current 2310 increases, which results in a stronger pull-down path for the rectified voltage $V_{RX}$ over a shorter period of time.

Figure 24:
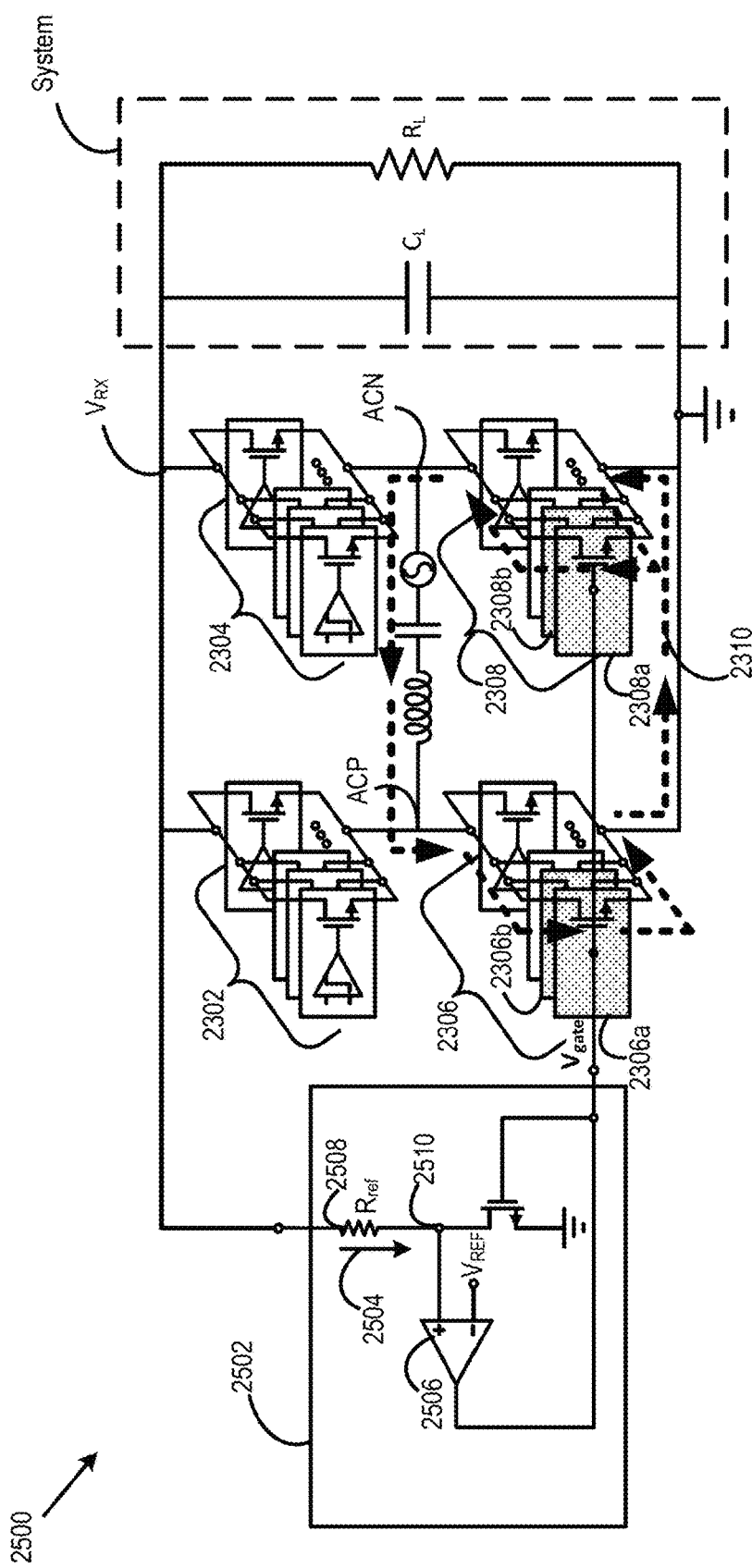
FIG. 24 is an exemplary schematic diagram of a rectifier with individually programmable FET segments.

FIG. 24 is an exemplary schematic diagram of a rectifier 2500, which is an implementation of the rectifier 1200 in the wireless power receiver 315 shown in FIG. 12. The rectifier 2500 has similar structure and includes the same components as the rectifier 2300 but also includes a gate voltage control circuit 2502 and feedback loop that control the gate voltages of the FET segments 2306a,b and 2308a,b. In some implementations, the gate control circuit 2502 includes an amplifier 2506 that outputs a signal 2512 based on a difference between a reference voltage $V_{REF}$ and an input node voltage 2510, which is based on current 2504 through reference resistor $R_{REF}$ 2508. The current 2504 develops based on a difference between the rectified voltage $V_{RX}$ and the reference voltage $V_{REF}$. When an overvoltage condition occurs, the rectified voltage $V_{RX}$ increases, which results in an increase in the current 2504 and input node voltage 2510. An increase in the difference between the input node voltage 2510 and the reference voltage $V_{REF}$ causes an increase voltage at the output of amplifier 2506, which results in an increased gate voltage ($V_{gate}$) at the FET segments 2306a,b and 2308a,b. As the gate voltage applied to FET segments 2306a,b and 2308a,b is increased, the current 2310 increases, which results in a stronger pull-down path for the rectified voltage $V_{RX}$ over a shorter period of time. In one example, the microcontroller 412 can output control signals to modify the resistance of the reference resistor $R_{REF}$ and/or the reference voltage $V_{REF}$ for the comparator 2506. In addition, the microcontroller 412 can control the number of FET segments that are configured for the voltage suppression mode. In some implementations, with greater than 40 dB of gain, the gate control circuit 2502 can control the gate voltage of the FET segments 2306a,b and 2308a,b within a 10 mV accuracy to reduce a rectified voltage that varies between 13V and 20V.

Figure 25:
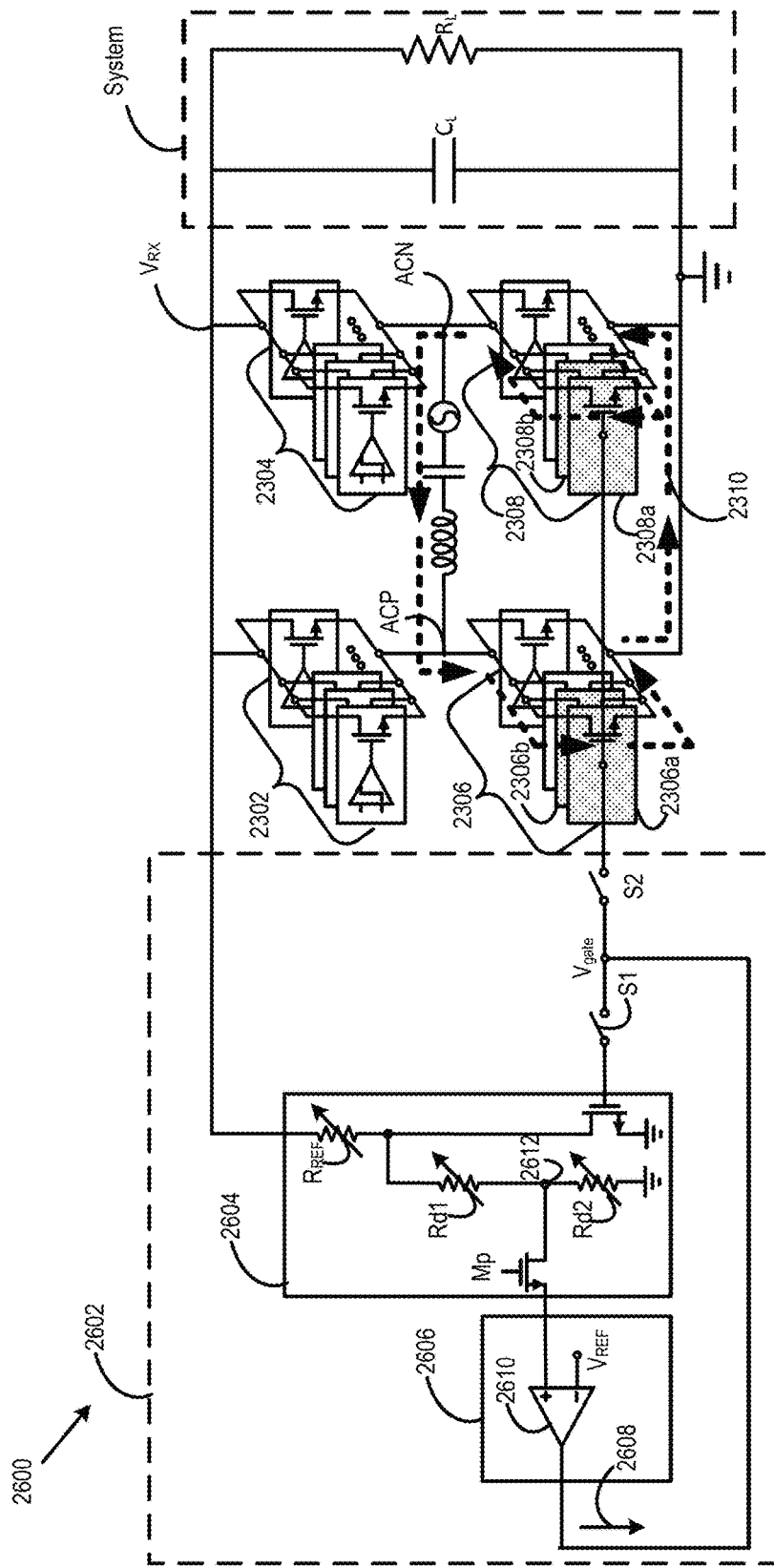
FIG. 25 is an exemplary schematic diagram of a rectifier with individually programmable FET segments.

FIG. 25 is an exemplary schematic diagram of a rectifier 2600, which is an implementation of the rectifier 1200 in the wireless power receiver 315 shown in FIG. 12. The rectifier 2600 has similar structure and includes the same components as the rectifier 2300 but also includes a gate voltage control circuit 2602 and feedback loop that control the gate voltages of the FET segments 2306a,b and 2308a,b. The gate control circuit 2602 includes a low voltage supply domain 2606 and a high voltage supply domain 2604 separated by a protection switch $M_P$ that operate to produce a voltage at the output of amplifier 2610 that drives the gates of the FET segments 2306a,b and 2308a,b of the rectifier 2600. Low voltage devices can be used in low voltage supply domain 2606 to save power and area. The gate of protection switch $M_P$ is driven by low voltage supply from the low voltage supply domain 2606 to protect the low voltage devices in low supply domain. The low voltage supply domain 2606 includes the amplifier 2610 that outputs the signal 2608 based on a difference between a reference voltage $V_{REF}$ and an input node voltage 2612. The low voltage supply domain 2606 can be implemented as an amplifier to provide both reduced power and hardware area.

The high voltage supply domain 2604 includes tunable resistors $R_{REF}$, Rd1, and Rd2. The resistors Rd1 and Rd2 make up a resistor divider that provides the ability to control a loop factor of the feedback loop of the gate voltage control circuit, and the ability to tune the resistors $R_{REF}$, Rd1, and Rd2 by the microcontroller 412 allows for the gate voltage driving the FET segments 2306a,b and 2308a,b to be controlled. In one example, the microcontroller 412 can output control signals to modify the resistances of the resistors $R_{REF}$, Rd1, and/or Rd2 as well as the reference voltage $V_{REF}$ for the comparator 2610. In addition, the microcontroller 412 can also control the number of FET segments that are configured for the voltage suppression mode.

The gate control circuit 2602 also includes switches S1 and S2 that align signal paths between the gate control circuit 2602 and the rectifier 2300 so that the gate control circuit 2602 can control the gate voltage of the FET segments 2306a,b and 2308a,b. For example, when the switches S1 and S2 are open, the gate control circuit 2602 is disconnected from the rectifier 2600, and the FET segments 2306a,b and 2308a,b, in addition to all of the other FET segments of the switches 2302, 2304, 2306, and 2308, operate in the rectification mode. The switches S1 and S2 can be closed to connected to the gate control circuit 2602 to the rectifier 2600 so that the FET segments 2306a,b and 2308a,b can be controlled in the voltage suppression mode to provide the discharge path for current 2310.

Figure 26:
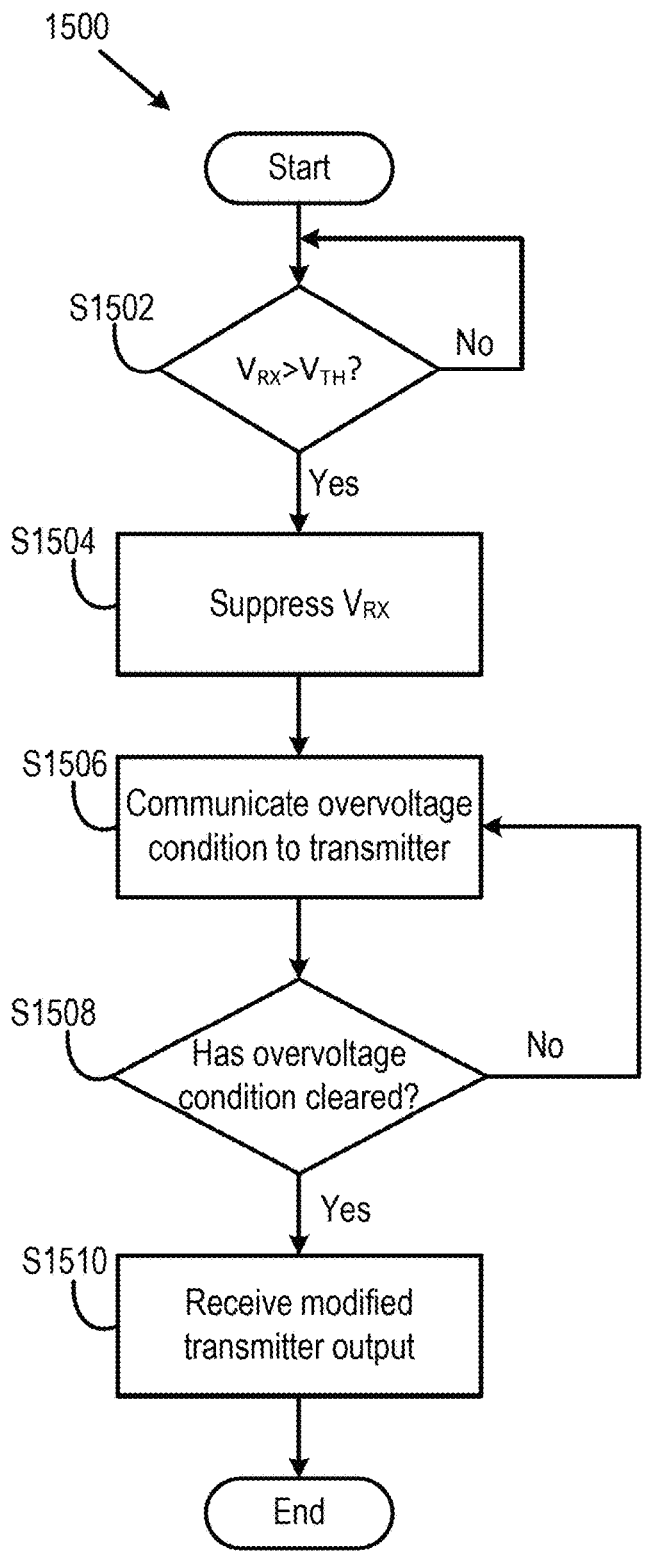
FIG. 26 is a flowchart for operations performed during the voltage suppression operation.

FIG. 26 is a flowchart illustrating a process 1500 for simultaneous overvoltage control and communication with the wireless power transmitter 321 discussed above, and operated in the microcontroller 412, digital state machine controller 1301, or the digital controller 1503. In some implementations, the steps of the process 1500 may correspond to software instructions that are executed by a processor with circuitry in the wireless power receiver 315 that is associated with the microcontrollers 412, 1301 and/or digital controller 1503. The overvoltage control provided by the process 1500 can be achieved through shunting one or more FETs and/or FET segments of the rectifier 1200 (FIG. 12) to ground. In one implementation, gate control pulses can be applied to the FETs of the rectifier 1300 (FIG. 13) to suppress the rectified voltage $V_{RX}$. In another implementation, one or more FET segments of the rectifier 2300, 2500, or 2600 (FIGS. 22, 24, and 25) can be aligned for the voltage suppression mode to provide a discharge path to drain charge from the $V_{RX}$ node. References to the rectifier 1200 throughout the description of the process 1500 can refer to any of the rectifiers 1300, 2300, 2500, or 2600 unless explicitly stated otherwise.

At step S1502, the microcontroller 412 (or 1301) that drives the gates of the FETs of the rectifier 1200 determines whether the voltage $V_{RX}$ is greater than a threshold voltage $V_{TH}$ associated with an overvoltage condition. The threshold voltage $V_{TH}$ may correspond to a maximum system voltage or may be less than the maximum system voltage. In some implementations, the microcontroller 412 is able to perform the functions of the comparator 418 or receives an output signal from the comparator 418 that indicates whether or not the rectified voltage $V_{RX}$ is greater than the threshold voltage $V_{TH}$. If the rectified voltage $V_{RX}$ is less than or equal to the threshold voltage $V_{TH}$, resulting in a "no" at step S1702, then the process returns to step S1702. However if the rectified voltage $V_{RX}$ is greater than the threshold voltage $V_{TH}$, resulting in a "yes" at step S1502, then step S1504 is performed.

In implementations where the rectifier 1200 is implemented as the rectifier 2500 or 2600 that includes the gate control circuit 2502 or 2602, the determination of whether the overvoltage condition has occurred is based on a difference between the rectified voltage $V_{RX}$ and the input node voltage 2510 or 2612, which produces a current that drives amplifier 2506 or 2610, which produces the signal 2512 or 2608 that controls the gate voltage of the FET segments 2306a,b and 2308a,b.

At step S1504, if the rectified voltage $V_{RX}$ is greater than the threshold voltage $V_{TH}$, indicating that the overvoltage condition has occurred, then the rectifier 1200 can suppress the rectified voltage $V_{RX}$. In one implementation where the rectifier 1200 is implemented with the rectifier 1300 described previously (FIG. 13), the microcontroller 1301 controls the rectifier 1300 in the voltage suppression mode by applying the gate control pulses to the FETs of the rectifier 1300 to reduce $V_{RX}$ to below the threshold voltage $V_{TH}$. By having one or more of the FETs shown in the rectifier 1300 controlled by the microcontroller 1301, charge can be shunted from the $V_{RX}$ node to ground as the FETs are cycled on and off by the microcontroller 1301. For example, the microcontroller 1301 can output the gate control pulses to the gates of the FETs of the rectifier 1300 to turn the FETs on and off. In the present example, if the rate and turn-on duration of the one or more gates of the FETs is set to be less than or equal to one-tenth of the clock rate of the field clock for controlling transmissions to the wireless power transmitter 321, there is not a noticeable negative effect on data detection rate at the wireless power transmitter 321. Also, the amount of time that the FETs are shunted to ground corresponds to a predetermined amount of reduction in the rectified voltage $V_{RX}$ so that the reduced rectified voltage after the gate control pulse is applied is less than the voltage threshold $V_{TH}$. In addition, the microcontroller 1301 can determine how many of the FETs of the rectifier to turn on and off based on a magnitude of the voltage at the $V_{RX}$ node. For example, as the magnitude of the voltage at the $V_{RX}$ node increases, the microcontroller 1301 can shunt a greater number of the rectifier FETs to ground. In implementations where the FETs 609 and 612 are substituted with current sources the current sources or other control loop are activated to enable current to be pulled from the ACP/ACN lines in order to reduce the rectified voltage $V_{RX}$.

In some implementations where the rectifier 1200 is implemented with the rectifier 2300 described previously (FIG. 22), the configuration of the FET segments of the switches 2302, 2304, 2306, and 2308 can be individually controlled based on control signals output from the microcontroller 412 or another control circuit in the wireless power receiver 315. In some implementations, the microcontroller 412 can configure one or more of the FET segments for the voltage suppression mode by directly controlling a gate voltage of one or more of the FET segments, which corresponds to an amount of effective OVP resistance which the remaining FET segments of the switches 2306 and 2308 are configured for rectification of the AC current from the coil 506 into a DC current at the rectification node $V_{RX}$. For example, controlling the gate voltages of FET segments 2306a,b and 2308a,b in a range from approximately 1.5 Volts (V) to 2 Volts corresponds to an effective OVP resistance of approximately 3Ω. As the gate voltages of the switches are increased, the effective OVP resistance decreases, which results in an increased current 2310 that reduces the rectified voltage $V_{RX}$ more quickly. The effective OVP resistance associated with the FET segments of the switches 2306 and 2308 can also be modified by increasing or decreasing the number of FET segments that are configured for OVP. For example, increasing the number of FET segments of the switches 2306 and 2308 that are configured for the voltage suppression mode also decreases the effective OVP resistance.

In addition, the rectifier 2500 described previously (FIG. 24) includes the gate control circuit 2502 and feedback loop that control the gate voltages of the FET segments 2306a,b and 2308a,b. In some implementations, the gate control circuit 2502 includes the amplifier 2506 that outputs a voltage based on a difference between a reference voltage $V_{REF}$ and an input node voltage 2510, which is based on current 2504 through reference resistor $R_{REF}$ 2508. The current 2504 develops based on a difference between the rectified voltage $V_{RX}$ and the reference voltage $V_{REF}$. When an overvoltage condition occurs, the rectified voltage $V_{RX}$ increases, which results in an increase in the current 2504 and input node voltage 2510. An increase in the difference between the input node voltage 2510 and the reference voltage $V_{REF}$ causes an increased voltage at the output of the amplifier 2506, which results in an increased gate voltage ($V_{gate}$) at the FET segments 2306a,b and 2308a,b. As the gate voltage applied to FET segments 2306a,b and 2308a,b is increased, the current 2310 increases, which results in a stronger pull-down path for the rectified voltage $V_{RX}$ over a shorter period of time.

Similarly, the rectifier 2600 described previously (FIG. 25) includes the gate control circuit 2602 and feedback loop that control the gate voltages of the FET segments 2306a,b and 2308a,b. The gate control circuit 2602 includes a low voltage supply domain 2606 and a high voltage supply domain 2604 separated by a protection switch $M_P$ that operate to produce signal 2608 that drives the gates of the FET segments 2306a,b and 2308a,b of the rectifier 2600. The gate of protection switch $M_P$ is driven by low voltage supply for the low voltage supply domain 2606. The low voltage supply domain 2606 includes an amplifier 2610 that outputs a voltage based on a difference between a reference voltage $V_{REF}$ and an input node voltage 2612. The low voltage supply domain 2606 can be implemented as an amplifier to provide both reduced power and hardware area.

The process then proceeds to step S1506 where the wireless power receiver 315 is driven to communicate through load modulation to the wireless power transmitter 321 of the overload condition so that the wireless power transmitter 321 can take corrective action. The load modulation communication system that drives communications with the wireless power transmitter 321 can include capacitor 1501 connected to ACP terminal 1202, capacitor 1502 connected to ACN terminal 1204, and a digital controller 1503 that is configured to control a capacitance of the capacitors 1501 and/or 152 via one or more switches. For example, the capacitors 1501 and 1502 are connected in series to FETs 1504 and 1505 that are connected to and controlled by the digital controller 1503. The digital controller 1503 can modify the capacitance of the capacitor 1501 and/or capacitor 1502 by controlling switching of FET 1504 and/or 1505 connected in series with the capacitors 1501 or 1502. For example, the digital controller 1503 can communicate a digital one to the wireless power transmitter 321 by increasing the capacitance of the capacitors 1501 and/or 1502 to greater than a predetermined capacitance. Likewise, a digital zero can be communicated to the wireless power transmitter 321 by decreasing the capacitance of the capacitors 1501 and/or 1502 to be less than or equal the predetermined capacitance.

In other implementations, a variety of different capacitors may be switched in or out under control of the digital controller 1503 so that multi-level signaling may be used. Moreover, by performing load modulation by effectively adding capacitors to the AC terminals 1202 and 1204, the wireless power transmitter 321 recognizes increased capacitance as a digital one, and lesser capacitance as a digital zero.

At step S1508, the microcontroller 412 or 1301 determines whether or not the overvoltage condition has cleared. In some implementations, the microcontroller 1301 determines that the overvoltage threshold has cleared if a voltage across the ACP and ACN lines of the wireless power receiver 315 is less than a threshold voltage that may correspond to the voltage threshold $V_{TH}$ or may be less than the voltage threshold $V_{TH}$. In addition, the microcontroller may determine that the overvoltage condition has cleared when a difference between the threshold voltage $V_{TH}$ and the rectified voltage $V_{RX}$ is greater than a predetermined value. If the overvoltage condition has cleared, and the rectified voltage $V_{RX}$ is less than or equal to the threshold voltage $V_{TH}$, then step S1510 is performed. Otherwise, if the overvoltage condition has not cleared due to the rectified voltage $V_{RX}$ being greater than the threshold voltage $V_{TH}$, then the process returns to step S1506 to continue to communicate the overvoltage condition to the wireless power transmitter 321.

At step S1510, in response determining that the overvoltage condition has cleared due to wireless power transmitter 321 reducing the magnitude of magnetic flux, the microcontroller 1301 can transition back to the rectification mode of operation for the rectifier 1200 and ceases transmitting the gate control pulses to shunt the one or more FETs of the rectifier 1200 to ground. For example, the microcontroller 1301 may receive sensor data from at least one voltage sensor on the ACP and/or ACN lines of the wireless power receiver 315 that indicate that the overvoltage condition has cleared due to a reduction in the magnitude of a wirelessly induced voltage at the wireless power receiver 315.

The flowcharts of FIGS. 11 and 15 show the functionality and operation of portions of the wireless power receiver 315. If portions are embodied in software, each block may represent a module, segment, or portion of code that includes program instructions to implement the specified logical function(s), which may be executed by the microcontroller 412. The program instructions may be embodied in the form of source code that includes human-readable statements written in a programming language or machine code that includes numerical instructions recognizable by a suitable execution system such as a processor in the portable device 106 (FIG. 1). The machine code may be converted from the source code, etc. If embodied in hardware, each block may represent a circuit or a number of interconnected circuits to implement the specified logical function(s).

Although the flowcharts of FIGS. 11 and 26 show a specific order of execution, it is understood that the order of execution may differ from that which is depicted. For example, the order of execution of two or more blocks may be varied relative to the order shown. Also, two or more blocks shown in succession in FIGS. 11 and 26 may be executed concurrently or with partial concurrence. Further, in some examples, one or more of the blocks shown in FIGS. 11 and 26 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Various systems described herein may be embodied in general-purpose hardware, dedicated hardware, software, or a combination thereof. If embodied in hardware, each block in FIGS. 11 and 26 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, one or more programmable logic devices (e.g., a field programmable gate array (FPGA), a complex programmable logic device (CPLD), etc.), or other components, etc. Such technologies are generally well known by those skilled in the art and, consequently, are not described in detail herein.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

It is emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. An electronic device comprising:
   circuitry configured to
      receive a wirelessly induced voltage from another device via a magnetically induced connection with the another device,
      determine that an overvoltage condition exists in a case that the wirelessly induced voltage exceeds a first threshold voltage,
      control switches of a rectifier that converts the wirelessly induced voltage to a rectified voltage, wherein each of the switches of the rectifier include a plurality of parallel-connected switch segments, and
      configure one or more of the plurality of parallel-connected switch segments of one or more of the switches of the rectifier to operate in a voltage suppression mode by directly controlling a gate voltage of the one or more of the plurality of parallel-connected switch segments, wherein
   the one or more the one or more of the plurality of parallel-connected switch segments operating in the voltage suppression mode are configured to provide a discharge path for a shunting current to reduce the rectified voltage in response to a determination that the overvoltage condition exists.

2. The device of claim 1, wherein the circuitry is further configured to communicate the overvoltage condition to the another device while simultaneously reducing a magnitude of the wirelessly induced voltage in response to determining that the overvoltage condition exists.

3. The device of claim 1, wherein the circuitry is further configured reduce the rectified voltage by shunting one or more of the switches of the rectifier to ground in response to a determination that the overvoltage condition exists.

4. The device of claim 3, wherein the circuitry is further configured to apply gate control pulses to the switches of the rectifier having a pulse length that is less than one tenth of a clock period of the another device.

5. The device of claim 1, wherein the circuitry is further configured to determine the gate voltage for the one or more of the plurality of parallel-connected switch segments operating in the voltage suppression mode that corresponds to a predetermined amount of resistance for the shunting current.

6. The device of claim 5, wherein the circuitry is further configured to increase a discharge rate of the shunting current by increasing the gate voltage for the one or more of the plurality of parallel-connected switch segments configured for the voltage suppression mode.

7. The device of claim 1, wherein the circuitry is further configured to determine a number of the one or more of the plurality of parallel-connected switch segments operating in the voltage suppression mode that corresponds to a predetermined amount of resistance for the shunting current.

8. The device of claim 7, wherein the circuitry is further configured to increase a discharge rate of the shunting current by increasing the number of the one or more of the plurality of parallel-connected switch segments operating in the voltage suppression.

9. The device of claim 1, wherein the rectifier further includes gate control circuitry with an amplifier configured to output the gate voltage to the one or more of the plurality of parallel-connected switch segments operating in the voltage suppression mode based on a difference between the rectified voltage and a reference voltage.

10. The device of claim 9, wherein the circuitry is further configured to control the gate voltage of the one or more of the plurality of parallel-connected switch segments operating in the voltage suppression mode by modifying a resistance of one or more tunable resistors of a resistor divider at an input to the amplifier.

11. The device of claim 1, wherein the circuitry is further configured to control communication of the overvoltage condition to the another device.

12. The device of claim 11, wherein the circuitry is further configured to control the communication of the overvoltage condition to the another device by modifying a capacitance of a first capacitor connected to a positive terminal or a second capacitor connected to a negative terminal of the device.

13. The device of claim 12, wherein the circuitry is further configured to modify the capacitance of the first capacitor or the second capacitor by controlling switching of a first switch connected in series with the first capacitor or a second switch connected in series with the second capacitor.

14. The device of claim 12, wherein the circuitry is further configured to:
   communicate a digital one to the another device by increasing the capacitance of the first capacitor or the second capacitor to greater than a capacitance threshold; and communicate a digital zero to the another device by decreasing the capacitance of the first capacitor or the second capacitor to less than or equal a capacitance threshold.

15. A method comprising:

receiving, at an electromagnetic coil of a device, a wirelessly induced voltage from another device via a magnetically induced connection with the another device;

determining, via circuitry of the device, that an overvoltage condition exists in a case that the wirelessly induced voltage exceeds a first threshold voltage;

control, via the circuitry, switches of a rectifier that converts the wirelessly induced voltage to a rectified voltage, wherein each of the switches of the rectifier include a plurality of parallel-connected switch segments; and configure, via the circuitry, one or more of the plurality of parallel-connected switch segments of one or more of the switches of the rectifier to operate in a voltage suppression mode by directly controlling a gate voltage of the one or more of the plurality of parallel-connected switch segments, wherein the one or more the one or more of the plurality of parallel-connected switch segments operating in the voltage suppression mode are configured to provide a discharge path for a shunting current to reduce the rectified voltage in response to a determination that the overvoltage condition exists.

16. A wireless power receiver comprising:

circuitry configured to receive a wirelessly induced Power Matters Alliance (PMA) or Wireless Power Consortium (WPC) signal at a voltage from a wireless power transmitter via a magnetically induced connection with the transmitter, determine that an overvoltage condition exists in a case that the voltage exceeds a first threshold voltage, control switches of a rectifier that converts the wirelessly induced voltage to a rectified voltage, wherein each of the switches of the rectifier include a plurality of parallel-connected switch segments, and configure one or more of the plurality of parallel-connected switch segments of one or more of the switches of the rectifier to operate in a voltage suppression mode by directly controlling a gate voltage of the one or more of the plurality of parallel-connected switch segments, wherein the one or more the one or more of the plurality of parallel-connected switch segments operating in the voltage suppression mode are configured to provide a discharge path for a shunting current to reduce the rectified voltage in response to a determination that the overvoltage condition exists.

17. The device of claim 1, wherein the circuitry is further configured to communicate the overvoltage condition to the another device via the magnetically induced connection.

18. The method of claim 15, further comprising:

communicating, via the circuitry, the overvoltage condition to the another device via the magnetically induced connection.

19. The wireless power receiver of claim 16, wherein the circuitry is further configured to communicate the overvoltage condition to the wireless power transmitter via the magnetically induced connection.

* * * * *